US012316215B2

(12) United States Patent
Yaguchi et al.

(10) Patent No.: US 12,316,215 B2
(45) Date of Patent: May 27, 2025

(54) INTEGRATED CIRCUIT HAVING AMPLITUDE-BASED SWITCHING CONTROL AND POWER SUPPLY CIRCUIT CONTAINING THE SAME

(71) Applicant: FUJI ELECTRIC CO., LTD., Kawasaki (JP)

(72) Inventors: Yukihiro Yaguchi, Matsumoto (JP); Takato Sugawara, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 248 days.

(21) Appl. No.: 17/972,387

(22) Filed: Oct. 24, 2022

(65) Prior Publication Data

US 2023/0179113 A1 Jun. 8, 2023

(30) Foreign Application Priority Data

Dec. 8, 2021 (JP) ................................ 2021-199087

(51) Int. Cl.
*H02M 1/42* (2007.01)
*H02M 1/00* (2007.01)
*H02M 3/156* (2006.01)

(52) U.S. Cl.
CPC ....... *H02M 1/4225* (2013.01); *H02M 1/0009* (2021.05); *H02M 3/156* (2013.01)

(58) Field of Classification Search
CPC ............. H02M 1/0032; H02M 1/0035; H02M 1/4208; H02M 1/42; H02M 1/4225
See application file for complete search history.

(56) References Cited

U.S. PATENT DOCUMENTS

| 10,965,209 | B2* | 3/2021 | Endo ................. | H02M 3/33507 |
| 2010/0164579 | A1* | 7/2010 | Acatrinei ............ | H02M 1/4208 327/172 |
| 2012/0201063 | A1* | 8/2012 | Sugawara ........... | H02M 1/4225 363/89 |
| 2014/0062433 | A1* | 3/2014 | Zhou .................. | H02M 3/1584 323/271 |
| 2014/0085949 | A1* | 3/2014 | Sugawara ........... | H02M 1/4225 363/89 |

(Continued)

FOREIGN PATENT DOCUMENTS

| JP | 2014-131455 A | 7/2014 |
| JP | 2017-225260 A | 12/2017 |

*Primary Examiner* — Gustavo A Rosario-Benitez
(74) *Attorney, Agent, or Firm* — Rabin & Berdo, P.C.

(57) ABSTRACT

An integrated circuit for controlling switching of a transistor in a power supply circuit. The integrated circuit includes: a first detection circuit configured to detect whether an inductor current has reached a first predetermined value; a signal output circuit configured to operate in a first mode or a second mode; a control circuit configured to control the signal output circuit to operate in the first mode when an amplitude of the first voltage after the inductor current has reached the first predetermined value is smaller than a second predetermined value, and to operate in the first mode or the second mode, corresponding to a condition of a load of the power supply circuit, when the amplitude is larger than the second predetermined value; and a driver circuit configured to turn on and off the transistor based respectively on the signal and a feedback voltage corresponding to the output voltage.

8 Claims, 12 Drawing Sheets

(56) References Cited

U.S. PATENT DOCUMENTS

2014/0185334 A1    7/2014   Chen
2016/0241134 A1*   8/2016   Maruyama .......... H02M 1/4225
2017/0366090 A1   12/2017   Sugawara
2020/0144906 A1*   5/2020   Endo ................. H02M 3/33507

* cited by examiner

INTEGRATED CIRCUIT HAVING AMPLITUDE-BASED SWITCHING CONTROL AND POWER SUPPLY CIRCUIT CONTAINING THE SAME

CROSS-REFERENCE TO RELATED APPLICATION

The present application claims priority pursuant to 35 U.S.C. § 119 (a) from Japanese Patent Application Number 2021-199087, filed on Dec. 8, 2021, the entire disclosure of which is hereby incorporated by reference herein.

BACKGROUND

Technical Field

The present disclosure relates to an integrated circuit and a power supply circuit.

Description of the Related Art

A conventional power supply circuit that outputs a target level direct-current (DC) voltage from an alternating-current (AC) source to a load includes an integrated circuit that controls a switching device so as to correct a power factor (for example, Japanese Patent Application Publication Nos. 2014-131455 and 2017-225260).

Such an integrated circuit generally includes a circuit that operates to reduce a switching frequency in order to reduce switching loss when the load is light. Specifically, the integrated circuit prolongs a waiting period until the switching device is turned on after the switching device is turned off and an inductor current becomes zero.

However, when the AC source voltage becomes a high phase angle, the waiting period is not properly set inside the integrated circuit, and a restart timer may turn on the switching device with a waiting period longer than desired. In this case, noise may be generated in an output current and the power factor may deteriorate.

SUMMARY

A first aspect of the present disclosure to achieve the above objective is an integrated circuit for a power supply circuit that generates an output voltage at a target level from an alternating-current (AC) voltage, the power supply circuit including a first inductor to which a rectified voltage corresponding to the AC voltage is applied, and a transistor configured to control an inductor current flowing through the first inductor, the integrated circuit being configured to control switching of the transistor. The integrated circuit comprises: a first detection circuit configured to detect whether or not the inductor current has reached a first predetermined value, based on a first voltage corresponding to the inductor current; a signal output circuit configured to operate in a first mode of outputting a signal to turn on the transistor when the inductor current has reached the first predetermined value, or in a second mode of outputting the signal to turn on the transistor when a first period elapses after the inductor current has reached the first predetermined value; a control circuit configured to control the signal output circuit to operate in the first mode when an amplitude, which is an amplitude of the first voltage after the inductor current has reached the first predetermined value, is smaller than a second predetermined value, and operate in either the first mode or the second mode, corresponding to a condition of a load of the power supply circuit, when said amplitude is larger than the second predetermined value; and a driver circuit configured to turn on the transistor based on the signal and to turn off the transistor based on a feedback voltage corresponding to the output voltage.

A second aspect of the present disclosure to achieve the above objective is a power supply circuit configured to generate an output voltage at a target level an alternating-current (AC) voltage. The power supply circuit comprises: a first inductor to which a rectified voltage corresponding to the AC voltage is applied; a transistor configured to control an inductor current flowing through the first inductor; and an integrated circuit configured to control switching of the transistor. The integrated circuit includes a first detection circuit configured to detect whether or not the inductor current has reached a first predetermined value, based on a first voltage corresponding to the inductor current, a signal output circuit configured to operate in a first mode of outputting a signal to turn on the transistor when the inductor current has reached the first predetermined value, or in a second mode of outputting the signal to turn on the transistor when a first period elapses after the inductor current has reached the first predetermined value, a control circuit configured to control the signal output circuit to operate in the first mode when an amplitude, which is an amplitude of the first voltage after the inductor current has reached the first predetermined value, is smaller than a second predetermined value, and operate in either the first mode or the second mode, corresponding to a condition of a load of the power supply circuit, when said amplitude is larger than the second predetermined value, and a driver circuit configured to turn on the transistor based on the signal and to turn off the transistor based on a feedback voltage corresponding to the output voltage.

Note that the above summary of the invention does not enumerate all the necessary features of the present invention, and a sub-combination of these feature groups can also be the invention.

BRIEF DESCRIPTION OF THE DRAWINGS

FIG. 1 shows an example of a configuration of a general AC-DC converter 10a.

FIG. 2 shows an example of a configuration of a general power factor correction IC 29a.

FIG. 3 shows an example of a configuration of a frequency reduction circuit 50a.

FIG. 7 shows an example of an inductor current waveform of an AC-DC converter 10a.

DETAILED DESCRIPTION

The present disclosure will be described below through embodiments of the disclosure, but the following embodiments are not intended to limit the disclosure according to the scope of claims. Also, not all the combinations of the features described in the embodiments are necessarily essential to the solutions of the disclosure.

A term "couple" used herein means to "electrically couple" unless otherwise noted. Also, herein, a low logic level of a voltage or a signal is referred to as low, and a high logic level of a voltage or a signal is referred to as high.

Figure 1:
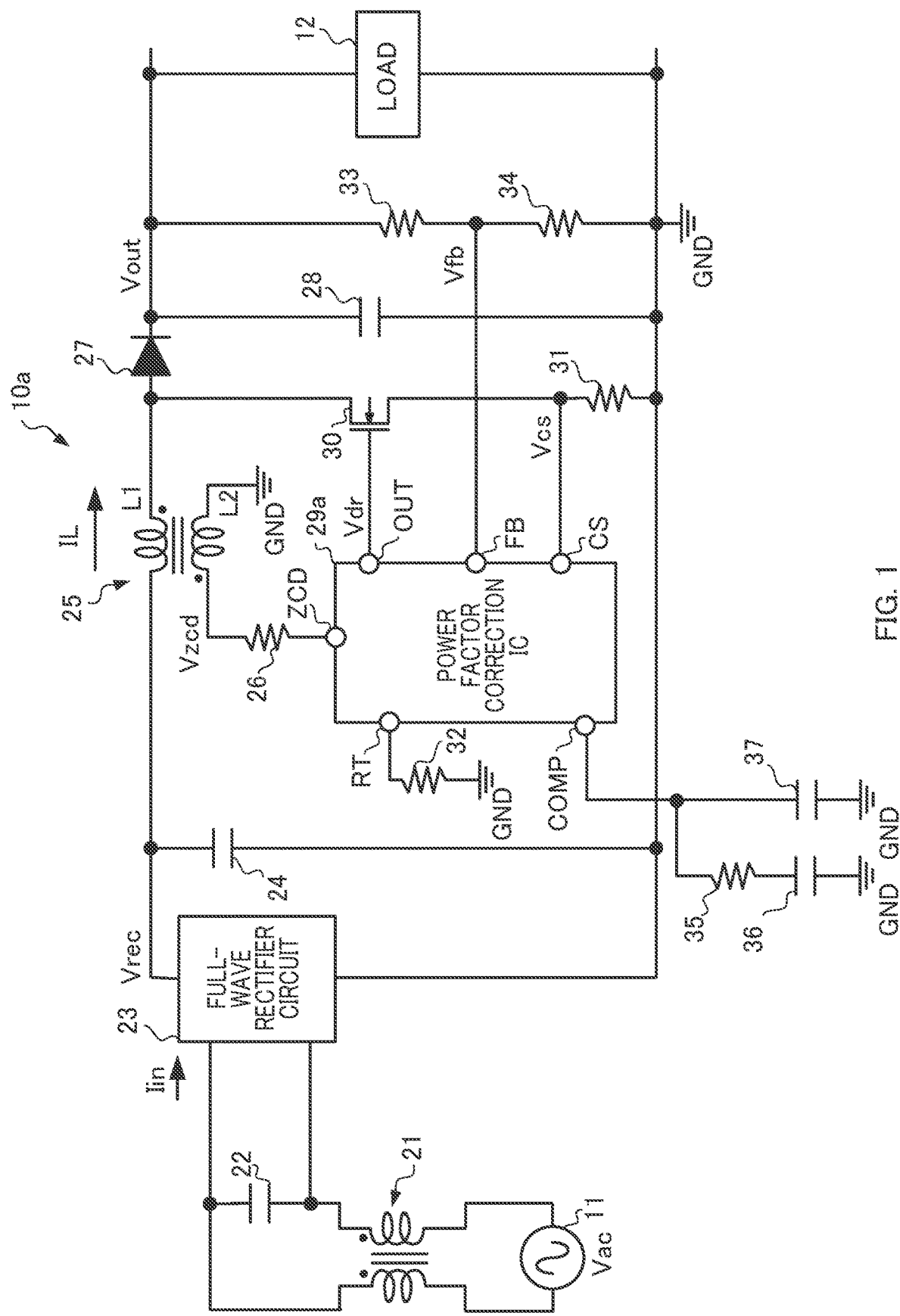

FIG. 1 shows an example of a configuration of a general AC-DC converter 10a. The AC-DC converter 10a is a boost chopper type power supply circuit that generates an output voltage Vout at a target level from an AC voltage Vac of an AC power supply 11. The AC-DC converter 10a drives a load 12 with the output voltage Vout.

Here, the AC power supply 11 is a commercial AC power supply for supplying the AC voltage Vac to the AC-DC converter 10a. The AC voltage Vac is a voltage of 100 to 277 V having a frequency of 50 to 60 Hz, for example. The load 12 is an electronic device that operates with a DC-DC converter and/or a direct-current (DC) voltage, for example.

<<Configuration of AC-DC Converter 10a>>

The AC-DC converter 10a includes a choke coil 21, capacitors 22, 24, 28, 36, and 37, a full-wave rectifier circuit 23, a transformer 25, resistors 26 and 31 to 35, a diode 27, a power factor correction IC 29a, and a MOS transistor 30.

==Input to Full-Wave Rectifier Circuit 23==

The choke coil 21 and the capacitor 22 remove noise from the voltage Vac and current supplied from the AC power supply 11 to the full-wave rectifier circuit 23. A voltage obtained by removing noise from the voltage Vac and an input current Iin are supplied from the AC power supply 11 to the full-wave rectifier circuit 23 via the choke coil 21 and the capacitor 22.

==Configuration from Full-Wave Rectifier Circuit 23 to Load 12==

The full-wave rectifier circuit 23 applies a rectified voltage Vrec, which is obtained by full-wave rectifying the predetermined AC voltage Vac having noise removed therefrom, to the capacitor 24 and a primary coil L1 of the transformer 25.

The capacitor 24 smooths the rectified voltage Vrec supplied from the full-wave rectifier circuit 23.

The transformer 25 includes the primary coil L1 and an auxiliary coil L2 magnetically coupled to the primary coil L1. Here, in an embodiment of the present disclosure, the auxiliary coil L2 is formed by winding such that a voltage generated in the auxiliary coil L2 has a polarity opposite to a polarity of a voltage generated in the primary coil L1.

The auxiliary coil L2 is coupled to a terminal ZCD of the power factor correction IC 29a (to be described later) via the resistor 26. Since a current corresponding to an inductor current IL flowing through the primary coil L1 flows through the auxiliary coil L2, a voltage Vzcd corresponding to the inductor current IL is applied to the terminal ZCD.

The primary coil L1 of the transformer 25 configures a boost chopper circuit with the diode 27 and the capacitor 28. Accordingly, a charge voltage of the capacitor 28 is boosted to the DC output voltage Vout and supplied to the load 12.

The power factor correction IC 29a is an integrated circuit that controls switching of the MOS transistor 30 such that the level of the output voltage Vout goes a target level (for example, 400 V) while improving the power factor of the AC-DC converter 10a. Specifically, the power factor correction IC 29a drives the MOS transistor 30 based on the inductor current IL flowing through the primary coil L1 and the output voltage Vout.

The power factor correction IC 29a is provided with terminals CS, COMP, FB, RT, OUT, and ZCD. Note that, although the power factor correction IC 29a is provided with terminals (for example, a power supply terminal, a GND terminal, and the like) other than CS, COMP, FB, RT, OUT, and ZCD, they are omitted in the drawings.

The MOS transistor 30 is a power transistor for controlling the power to the load 12 of the AC-DC converter 10a. Specifically, the MOS transistor 30 controls the inductor current IL flowing through the primary coil L1 of the transformer 25.

The MOS transistor 30 of this embodiment is an N-type metal oxide semiconductor (MOS) transistor, but is not limited thereto. Specifically, the MOS transistor 30 may be other transistors, such as a bipolar transistor, as long as the MOS transistor 30 is a transistor capable of controlling the power.

The MOS transistor 30 has a gate electrode coupled to a terminal OUT of the power factor correction IC 29a.

As will be described later with reference to FIG. 2, a voltage Vdr is applied to the gate electrode of the MOS transistor 30 from the power factor correction IC 29a. The power factor correction IC 29a controls the power to the load 12 by controlling the timing of changing the voltage level of the voltage Vdr.

The resistor 31 generates a voltage Vcs corresponding to a drain-source current of the MOS transistor 30. Since the drain-source current of the MOS transistor 30 changes with the inductor current IL, the inductor current IL can be detected by detecting the voltage Vcs generated in the resistor 31.

The resistor 31 has one end coupled to a source electrode of the MOS transistor 30 and the other end grounded. The voltage Vcs generated at both ends of the resistor 31 is applied to the terminal CS.

The resistor 32 is a resistor for adjusting an oscillation frequency of an oscillator circuit 44 (to be described later with reference to FIG. 2). The resistor 32 is coupled to the terminal RT, and the oscillation frequency is adjusted according to a resistance value of the resistor 32.

The resistors 33 and 34 generate a feedback voltage Vfb used in switching the MOS transistor 30 according to the output voltage Vout. A voltage divider circuit configured by the resistors 33 and 34 applies the divided voltage Vfb as a feedback voltage to the terminal FB of the power factor correction IC 29a.

The resistor 35 and the capacitors 36 and 37 are elements for phase compensation used for feedback control. The resistor 35 and the capacitor 36 are provided in series between the terminal COMP and the ground. The capacitor 37 is provided in parallel with the resistor 35 and the capacitor 36.

==Configuration of Power Factor Correction IC 29b==

Figure 2:
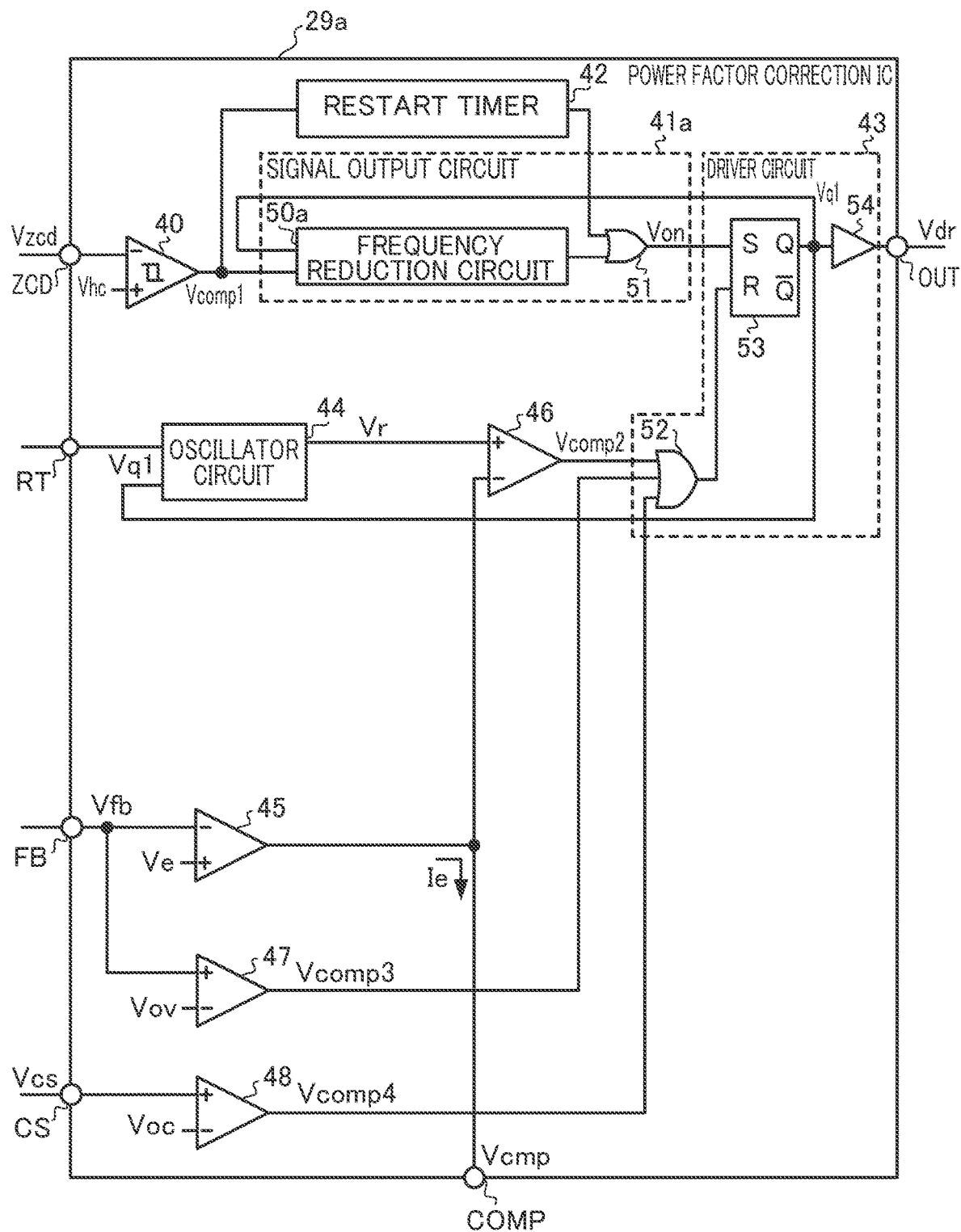

FIG. 2 shows an example of a configuration of the general power factor correction IC 29a. The power factor correction IC 29a includes a comparator circuit 40, a signal output circuit 41a, a restart timer 42, a driver circuit 43, an oscillator circuit 44, an error amplifier circuit 45, and comparator circuits 46 to 48.

The comparator circuit 40 detects whether or not the inductor current IL is "0" based on the voltage Vzcd applied to the terminal ZCD. Since the auxiliary coil L2 is electromagnetically coupled to the primary coil L1, the voltage Vzcd applied to the terminal ZCD becomes a voltage corresponding to the inductor current IL flowing through the primary coil. Here, "0" (zero) indicates substantially zero and "substantially zero" is hereinafter simply referred to as "0" (zero) as appropriate.

As a specific operation, the comparator circuit 40 compares the voltage Vzcd with a threshold Vth1 when the inductor current IL indicates 0. The comparator circuit 40 outputs a high signal Vcomp1 when the inductor current IL becomes 0.

Here, the inductor current IL vibrates in a sinusoidal manner due to resonance caused by the inductance of the transformer 25 and parasitic capacitance of the circuit such as the MOS transistor 30 after the MOS transistor 30 is turned off and indicates 0. As a result, the voltage Vzcd also vibrates in a sinusoidal manner after the MOS transistor 30 is turned off and indicates the threshold Vth1.

In the power factor correction IC 29a, the comparator circuit 40 is a hysteresis comparator. That is, the comparator circuit 40 has a different threshold Vthh determined according to the hysteresis, besides the threshold Vth1, according to the applied voltage Vhc. The comparator circuit 40 also compares the vibration of the voltage Vzcd based on the threshold Vthh. Note that the threshold voltage Vth1 and the threshold Vthh will be described later in detail with reference to FIGS. 5 and 6.

The comparator circuit 40 compares the voltage Vzcd with the threshold Vthh and outputs a signal Vcomp1 corresponding to the comparison result to the signal output circuit 41a and the restart timer 42.

After the inductor current IL becomes 0, the signal output circuit 41a outputs a signal Von to turn on the MOS transistor 30 in any of the critical mode, the bottom skip mode, and the operation mode of the restart timer 42.

The restart timer 42 outputs a signal to turn on the MOS transistor 30 when the load 12 becomes a light load condition and the comparator circuit 40 can no longer detect that the voltage Vzcd exceeds the threshold Vthh, for example. The operation of the restart timer 42 will be described later in detail with reference to FIG. 6.

The "light load condition" (i.e. a first state) of the load 12 is, for example, a state where the current flowing through the load 12 is a predetermined value (for example, 100 mA) or less. In this case, a state that is not the "light load condition" means a state where the current flowing through the load 12 is larger than 100 mA. On the other hand, a "heavy load condition" (i.e. a second state) of the load 12 is a state where the current flowing through the load 12 becomes a different predetermined value (for example, 1.0 A) or more.

Specifically, the restart timer 42 measures a period after the inductor current IL has become 0 based on the signal Vcomp1. The restart timer 42 outputs a signal to turn on the MOS transistor 30 when the high signal Vcomp1 continues to be outputted even after a period Trst (for example, 10 to 20 μs).

The driver circuit 43 turns on the MOS transistor 30 based on the signal Von outputted by the signal output circuit 41a, and turns off the MOS transistor 30 based on, for example, the feedback voltage Vfb corresponding to the output voltage Vout, as described later. Specifically, the driver circuit 43 applies a high voltage Vdr to the terminal OUT when turning on the MOS transistor 30 and applies a low voltage Vdr to the terminal OUT when turning off the MOS transistor 30. The driver circuit 43 includes an OR circuit 52, an RS flip-flop 53, and a buffer circuit 54.

The oscillator circuit 44 outputs a ramp wave Vr having an oscillation frequency corresponding to the resistance value of the resistor 31 to the comparator circuit 46.

The error amplifier circuit 45 is a transconductance amplifier, which outputs a current Ie corresponding to a difference between the feedback voltage Vfb and a reference voltage Ve. As a result, the capacitors 36 and 37 coupled to the terminal COMP are charged by the current Ie. Here, the reference voltage Ve is a voltage determined according to the output voltage Vout at the target level. It is also assumed that the voltage of the terminal COMP to which the output of the error amplifier circuit 45 is coupled is the voltage Vcmp.

The comparator circuit 46 compares the ramp wave Vr outputted by the oscillator circuit 44 with the voltage Vcmp applied to the terminal COMP. The comparator circuit 46 outputs a low signal Vcomp2 to the driver circuit 43 when the level of the ramp wave Vr is lower than that of the voltage Vcmp, and outputs a high signal Vcomp2 to turn off the transistor to the OR circuit 52 when the level of the ramp wave Vr is higher than that of the voltage Vcmp.

The comparator circuit 47 determines whether or not the output voltage Vout has become overvoltage based on the feedback voltage Vfb. Specifically, the comparator circuit 46 compares the feedback voltage Vfb corresponding to the output voltage Vout with a threshold voltage Vov indicating that the output voltage Vout is in an overvoltage state.

When the feedback voltage Vfb is higher than the threshold voltage Vov, the comparator circuit 47 determines that the voltage is overvoltage and outputs a high signal Vcomp3 to turn off the MOS transistor 30 to the OR circuit 52. When the feedback voltage Vfb is lower than the threshold voltage Vov, the comparator circuit 46 determines that the voltage is not overvoltage and outputs a low signal Vcomp3 to the OR circuit 52.

The comparator circuit 48 determines whether or not the inductor current IL has become overcurrent, based on the voltage Vcs. Specifically, the comparator circuit 47 compares the voltage Vcs with a threshold voltage Voc indicating that the inductor current IL is in an overcurrent state.

When the voltage Vcs is higher than the threshold voltage Voc, the comparator circuit 48 determines that the current is overcurrent and outputs a high signal Vcomp4 to turn off the MOS transistor 30. When the feedback voltage Vfb is lower than the threshold voltage Voc, the comparator circuit 46 determines that the current is not overcurrent and outputs a low signal Vcomp4.

==Configuration of Signal Output Circuit 41a==

An internal configuration of the signal output circuit 41a will be described. The signal output circuit 41a includes a frequency reduction circuit 50a and an OR circuit 51.

After the inductor current IL has become 0, the frequency reduction circuit 50a outputs a signal to turn on the MOS transistor 30 in the critical mode or the bottom skip mode to the OR circuit 51. A further specific configuration of the frequency reduction circuit 50a will be described later with reference to FIG. 3.

When the signal from the frequency reduction circuit 50a or the restart timer 42 goes high, the OR circuit 51 outputs a high signal Von to turn on the MOS transistor 30 to the RS flip-flop 53 of the driver circuit 43.

==Details of Driver Circuit 43==

When any of the signals Vcomp2, Vcomp3, and Vcomp4 is high, the OR circuit 52 supplies a high signal to turn off the MOS transistor 30 to an R input of the RS flip-flop 53.

When a low signal is inputted to the R input, the RS flip-flop 53 outputs a signal Vq1 to turn on and off the MOS transistor 30 from a Q output according to the level of the signal inputted to an S input. On the other hand, when a high signal to turn off the MOS transistor 30 is inputted to the R input, the RS flip-flop 53 outputs a low signal Vq1 to turn off the MOS transistor 30 from the Q output.

The buffer circuit 54 turns on and off the MOS transistor 30 according to the level of the signal Vq1 outputted from the RS flip-flop 53. Specifically, the buffer circuit 54 changes the voltage Vdr to high based on the high signal Vq1 to turn on the MOS transistor 30. On the other hand, the buffer circuit 54 changes the voltage Vdr to low based on the low signal Vq1 to turn off the MOS transistor 30.

As a result, the driver circuit 43 changes the voltage Vdr so that the output voltage Vout becomes the target level and turns off the MOS transistor 30 when an abnormality such as overcurrent is detected.

==Details of Frequency Reduction Circuit 50a==

Figure 3:
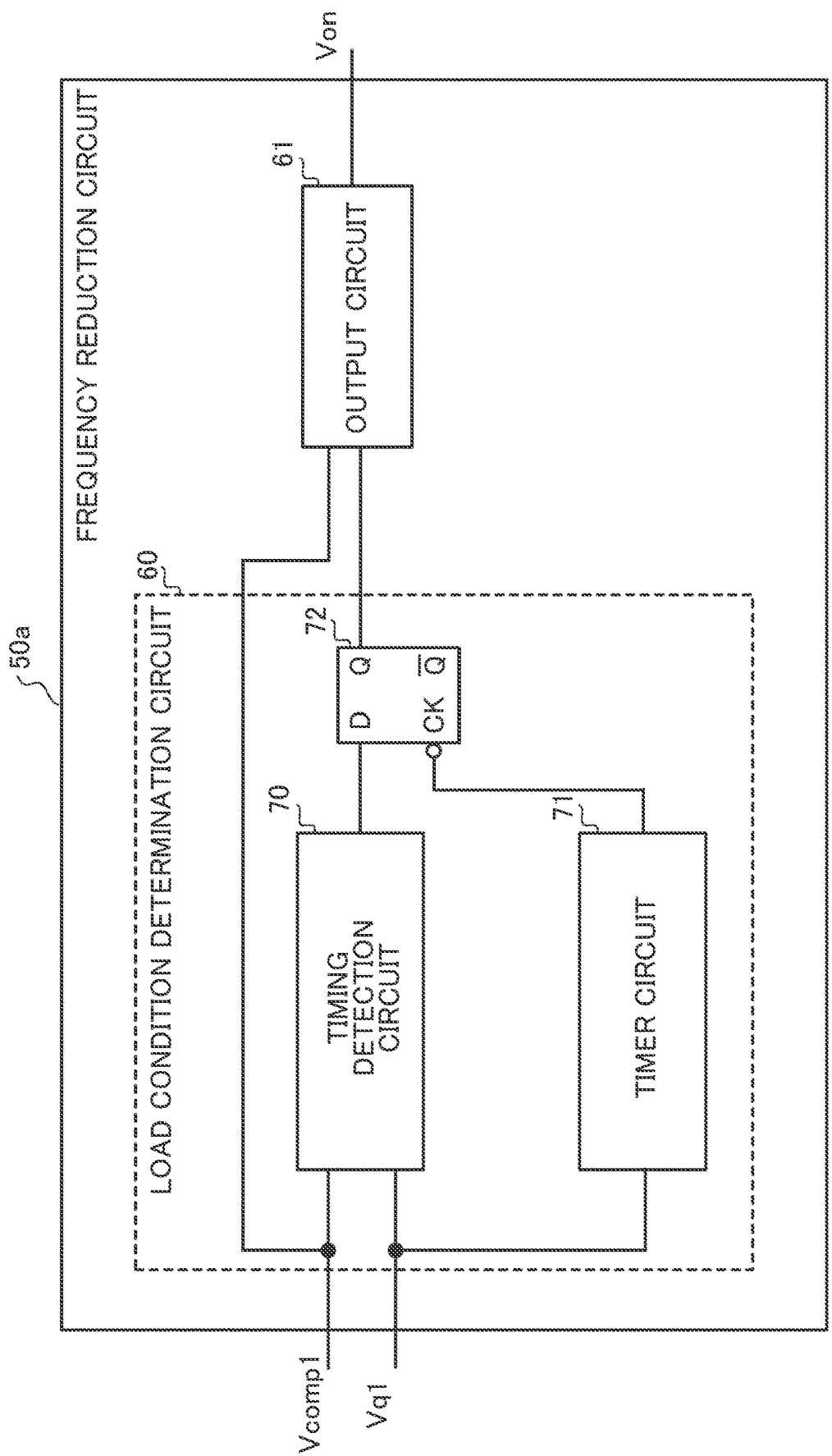

FIG. 3 shows an example of a configuration of the frequency reduction circuit 50a. The frequency reduction circuit 50a includes a load condition determination circuit 60 and an output circuit 61.

The load condition determination circuit 60 determines whether or not the load 12 is in the light load condition based on a period from when the MOS transistor 30 is turned on until the inductor current IL becomes 0.

Here, when the load 12 is in the light load condition, the power consumed by the load 12 decreases. In this case, the power transmitted from the full-wave rectifier circuit 23 to the load 12 via the transformer 25 and the boost chopper circuit is reduced. Therefore, the inductor current IL flowing through the primary coil L1 in the transformer 25 also decreases.

That is, when the load 12 is in the light load condition, the peak of the inductor current IL becomes lower, and thus a period from the timing when the MOS transistor 30 is turned on until the MOS transistor 30 is turned off and the inductor current IL becomes 0 is shortened. Therefore, when the load 12 is in the light load condition, the switching frequency of the MOS transistor 30 increases.

On the other hand, when the load 12 is in a heavy load condition, the peak of the inductor current IL becomes higher. Therefore, when the load 12 is in the heavy load condition, the period from the timing when the MOS transistor 30 is turned on to the timing when the inductor current IL becomes 0 after the MOS transistor 30 is turned off is extended. The load condition determination circuit 60 determines the condition of the load 12 by detecting this period.

===Details of Load Condition Determination Circuit 60===

The load condition determination circuit 60 includes a timing detection circuit 70, a timer circuit 71, and a D flip-flop 72.

The timing detection circuit 70 detects the timing when the inductor current IL indicates 0 after the MOS transistor 30 is turned off.

Specifically, the timing detection circuit 70 outputs a low signal to a D input of the D flip-flop 72 in response to the high signal Vq1 indicating the timing when the MOS transistor 30 is turned on. Thereafter, the timing detection circuit 70 changes the signal outputted to the D input of the D flip-flop 72 to high based on the high signal Vcomp1 indicating the timing when the inductor current IL becomes 0 after the MOS transistor 30 is turned off.

The timer circuit 71 calculates a period Ta for determining whether or not the load 12 is in the light load condition after the MOS transistor 30 is turned on.

Specifically, the timer circuit 71 starts timing from the timing when the signal Vq1 goes high and outputs the high signal to a CK input of the D flip-flop 72. Thereafter, the timer circuit 71 changes the signal outputted to the CK input of the D flip-flop 72 to low at the timing when the predetermined period Ta for determining the condition of the load 12 has elapsed.

The D flip-flop 72 determines whether or not the period during which the inductor current IL becomes 0 after the MOS transistor 30 is turned on is longer than the period Ta, that is, earlier than the timing for determining whether or not the load 12 is in the light load condition.

Specifically, the D flip-flop 72 outputs a signal corresponding to the level of the signal outputted to the D input by the timing detection circuit 70 from the Q output at the timing when the signal outputted to the CK input by the timer circuit 71 changes to low. Therefore, the condition of the load 12 can be determined based on the level of the signal outputted from the Q output by the D flip-flop 72.

As a result, the load condition determination circuit 60 compares the period from the timing when the MOS transistor 30 is turned on to the timing when the inductor current IL becomes 0 with the period Ta. When the period Ta is longer, the load condition determination circuit 60 determines that the load 12 is in the light load condition. When the period Ta is shorter, the load condition determination circuit 60 determines that the load 12 is not in the light load condition.

==Output Circuit 61==

The output circuit 61 detects that the inductor current IL flowing through the primary coil L1 has become 0, based on the signal Vcomp1. Thereafter, when the load condition determination circuit 60 outputs determination result indicating that the load 12 is in the light load condition, which is obtained by, the output circuit 61 outputs a signal to turn on the MOS transistor 30 in the bottom skip mode. On the other hand, when the load condition determination circuit 60 outputs a determination result indicating that the load 12 is not in the light load condition, the output circuit 61 outputs a signal to turn on the MOS transistor 30 in the critical mode.

=Critical Mode=

Here, the "critical mode" means a mode in which the output circuit 61 outputs a signal to turn on the MOS transistor 30 when the voltage Vzcd becomes the voltage Vth1 at which the inductor current IL indicates 0 after the MOS transistor 30 is turned off. As a result, in the critical mode, a period during which the inductor current IL is discontinuous is substantially zero.

When the load is not in the light load condition, the output circuit 61 of the AC-DC converter 10a outputs a signal to turn on the MOS transistor 30 in the critical mode. Hereinafter, the critical mode will be described in detail with reference to FIG. 4.

Here, description will start from time t1 when the driver circuit 43 outputs the high signal Vq1 to turn on the MOS transistor 30 after the MOS transistor 30 is turned off.

At time t1, the signal output circuit 41a in FIG. 2 outputs a pulsed signal Von to turn on the MOS transistor 30 in FIG. 1. As a result, the RS flip-flop 53 of the driver circuit 43 outputs a high signal Vq1. When the MOS transistor 30 is turned on, the inductor current IL starts to rise.

Here, when the MOS transistor 30 is turned on, a current flows between the drain and source of the MOS transistor 30, and thus the voltage of the primary coil L1 of the transformer 25 rises. On the other hand, the voltage of the auxiliary coil L2, which has a polarity opposite to that of the primary coil L1, decreases. As a result, the voltage Vzcd applied to the terminal ZCD also decreases to be lower than the threshold voltage Vth1. Therefore, at time t1, the comparator circuit 40 changes the level of the signal Vcomp1 to high.

The oscillator circuit 44 outputs a ramp wave Vr whose voltage level gradually rises from the timing when the MOS transistor 30 is turned on.

At time t2, the level of the ramp wave Vr outputted by the oscillator circuit 44 goes higher than the level of the voltage Vcmp applied to the terminal COMP. In this case, the comparator circuit 46 outputs a high signal Vcomp2.

In response to the high signal Vcomp2, the RS flip-flop 53 of the driver circuit 43 can output a low signal Vq1 to turn on the MOS transistor 30. In addition, the buffer circuit 54 lowers the voltage Vdr.

Therefore, at time t2, the MOS transistor 30 is turned off. Since the MOS transistor 30 is turned off, the voltage of the primary coil L1 of the transformer 25 decreases, and the voltage Vzcd having the opposite polarity increases.

When the inductor current IL flowing through the primary coil L1 becomes small at time t3, a current flows through the circuit due to resonance between the inductance of the primary coil and the parasitic capacitance of the circuit such as the parasitic capacitance of the MOS transistor 30. In this case, the voltage at both ends of the primary coil L1 increases and the voltage Vzcd decreases.

At time t4, the comparator circuit 40 determines that the voltage Vzcd applied to the terminal ZCD has become equal to or less than the threshold voltage Vth1. As a result, it is detected that the inductor current IL flowing through the primary coil L1 has become 0. Based on the detection result, the comparator circuit 40 changes the level of the outputted signal Vcomp1 from low to high.

In the critical mode, when it is detected that the inductor current IL flowing through the primary coil has become 0, the signal output circuit 41a outputs a high signal Von to turn on the MOS transistor 30.

In response to this, the RS flip-flop 53 outputs a high signal Vq1. In addition, the buffer circuit 54 raises the voltage Vdr applied to a gate electrode of the MOS transistor 30.

At time t4, the driver circuit 43 turns on the MOS transistor 30 as in the case of time t1. After time t4, the same operation as the period from time t1 to time t4 is repeated. Since the load 12 is not in the light load condition, the period from time t1 to time t4 (period from when the MOS transistor 30 is turned on until the MOS transistor 30 is turned off and the inductor current IL becomes 0) is illustrated to be longer than the period Ta.

===Bottom Skip Mode===

Figure 5:
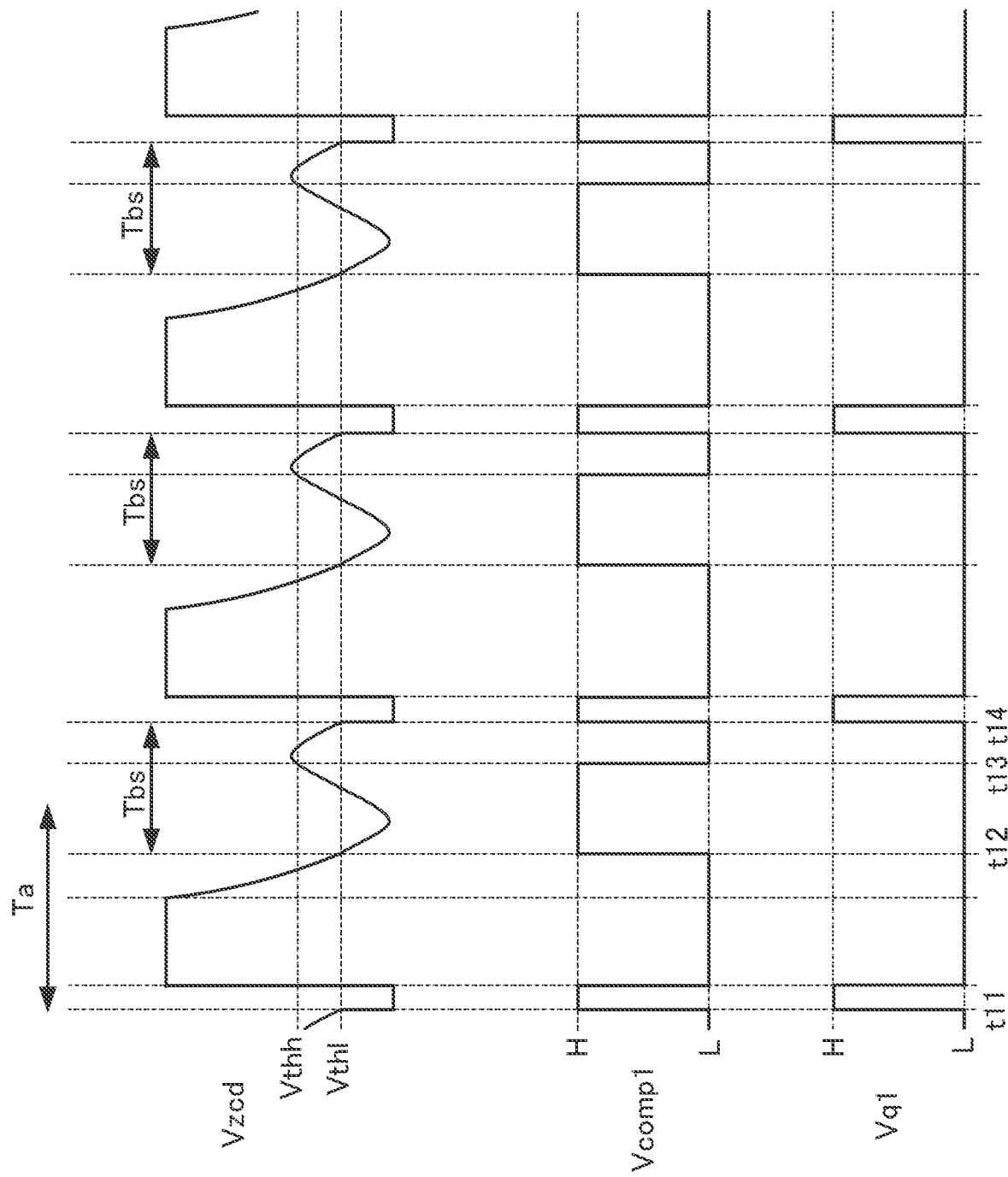
FIG. 5 shows an example of an operation waveform of the signal output circuit 41a in a bottom skip mode.

Now, with reference to FIG. 5, description is given of a case where the output circuit 61 in FIG. 3 operates in the bottom skip mode. The "bottom skip mode" is a mode in which, when the voltage Vzcd becomes the voltage Vth1 at which the inductor current IL indicates 0 after the MOS transistor 30 is turned off, the output circuit 61 outputs a signal to turn on the MOS transistor 30 after waiting for a certain period of time.

That is, in the bottom skip mode, the timing when the inductor current IL indicates 0 after the MOS transistor 30 is turned off and then the MOS transistor 30 is turned on again is after the elapse of the first timing of indicating the lowest value (bottom) due to the vibration of the voltage Vzcd.

Figure 4:
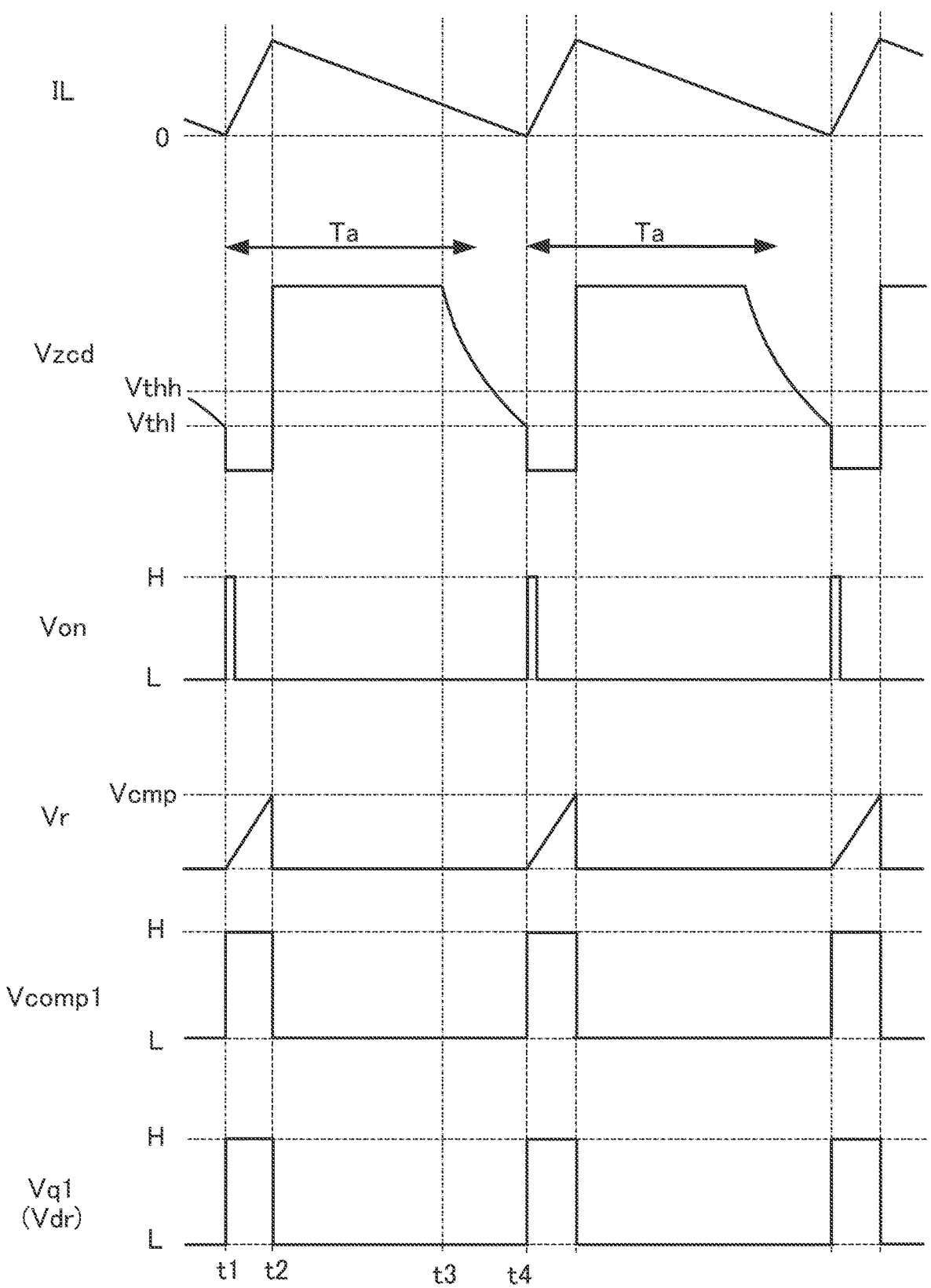
FIG. 4 shows an example of an operation waveform of a signal output circuit 41a in a critical mode.

The inductor current IL, the signal Von, and the ramp wave Vr are the same as those in FIG. 4 and thus are not illustrated in waveform diagrams of and after FIG. 5. Further, operation waveform diagrams are for the purpose of illustration, and the dimensions in a time direction and the like are different between FIG. 4 and the drawings of and after FIG. 5.

When the load condition determination circuit 60 determines that the load 12 is in the light load condition, the output circuit 61 operates in the bottom skip mode. That is, the load condition determination circuit 60 operates when the period from the timing when the MOS transistor 30 is turned on to the timing when the MOS transistor 30 is turned off and the inductor current IL becomes 0 is shorter than the period Ta.

Here, the operation of the output circuit 61 from time t11 when the MOS transistor 30 is turned on to time t12 when the MOS transistor 30 is turned off and the voltage Vzcd indicates the threshold Vth1 is the same as that in FIG. 4. Hereinafter, an operation of a circuit included in the power factor correction IC 29a after time t12 will be described.

At time t12, the comparator circuit 40 determines that the voltage Vzcd applied to the terminal ZCD is smaller than the threshold voltage Vth1. As a result, it is detected that the inductor current IL flowing through the primary coil L1 has become 0. Based on the detection result, the comparator circuit 40 changes the level of the outputted signal Vcomp1 from low to high.

In the bottom skip mode, after the MOS transistor 30 is turned off and the comparator circuit 40 detects that the inductor current IL has become 0, the signal output circuit 41a outputs a signal Von to turn on the MOS transistor 30 after waiting for a predetermined period Tbs.

After time t12, the inductor current IL and the voltage Vzcd vibrate in a sinusoidal manner after the inductor current IL becomes 0 due to resonance caused by the inductance of the transformer 25 and the parasitic capacitance of the circuit due to the MOS transistor 30 and the like. The amplitude of the voltage Vzcd depends on a boost ratio in the boost chopper circuit configured by the primary coil L1, the diode 27, and the capacitor 28. The amplitude of the voltage Vzcd increases as the boost ratio increases and decreases as the boost ratio decreases.

Here, since the amplitude of the voltage Vzcd is larger than |threshold Vthh-threshold Vth1|, the comparator circuit 40 detects that the voltage Vzcd vibrates and indicates a threshold Vzcdh after the voltage Vzcd indicates the threshold Vth1. Upon detecting that the voltage Vzcd indicates the threshold, the comparator circuit 40 changes the level of the signal Vcomp1 to be outputted to low.

That is, the comparator circuit 40 outputs a high signal Vcomp1 during a period from when the voltage Vzcd falls below the threshold Vth1 until the voltage Vzcd exceeds the threshold Vthh. On the other hand, the comparator circuit 40 outputs a low signal Vcomp1 during a period from when the voltage Vzcd exceeds the threshold value Vthh until the voltage Vzcd falls below the threshold Vth1 again.

At time t13, the comparator circuit 40 changes the signal Vcomp1 to be outputted to low in response to the voltage Vzcd indicating the threshold Vthh.

After it is detected that the inductor current IL has become 0, the signal output circuit 41a waits until the number of times the voltage Vzcd becomes the threshold value Vthh and then becomes the threshold value Vth1 due to the vibration of the voltage Vzcd reaches a predetermined number of times.

That is, in the bottom skip mode of the signal output circuit 41a, the predetermined period Tbs for which the signal output circuit 41a waits after the inductor current IL has become 0 is based on the number of times the voltage Vzcd becomes the threshold value Vthh and then becomes the threshold value Vth1. FIG. 5 shows an example where the predetermined number of times is 1 and the period between time t11 and time t13 corresponds to the period Tbs. This number of times can also be set to a larger number if the switching frequency in the light load condition is to be further reduced.

At time t14, the signal output circuit 41a outputs a signal Von to turn on the MOS transistor 30. As a result, the RS flip-flop 53 of the driver circuit 43 outputs a high signal Vq1. Also, at time t16, the comparator circuit 40 changes the level of the signal Vcomp1 to high.

At time t14, the MOS transistor 30 is turned on. After time t14, the operation from time t11 to time t14 is repeated. Since the load 12 is in the light load condition, FIG. 5 shows that the period between time t11 to time t12 (period from when the MOS transistor 30 is turned on until the MOS transistor 30 is turned off and the inductor current IL becomes 0) is shorter than the period Ta.

In the bottom skip mode, the output circuit 61 extends the period from the timing when the MOS transistor 30 is turned on to the timing when the MOS transistor 30 is turned off and then turned on again. As a result, the output circuit 61 reduces the switching frequency and reduces the switching loss.

==Operation of Restart Timer 42==

Figure 6:
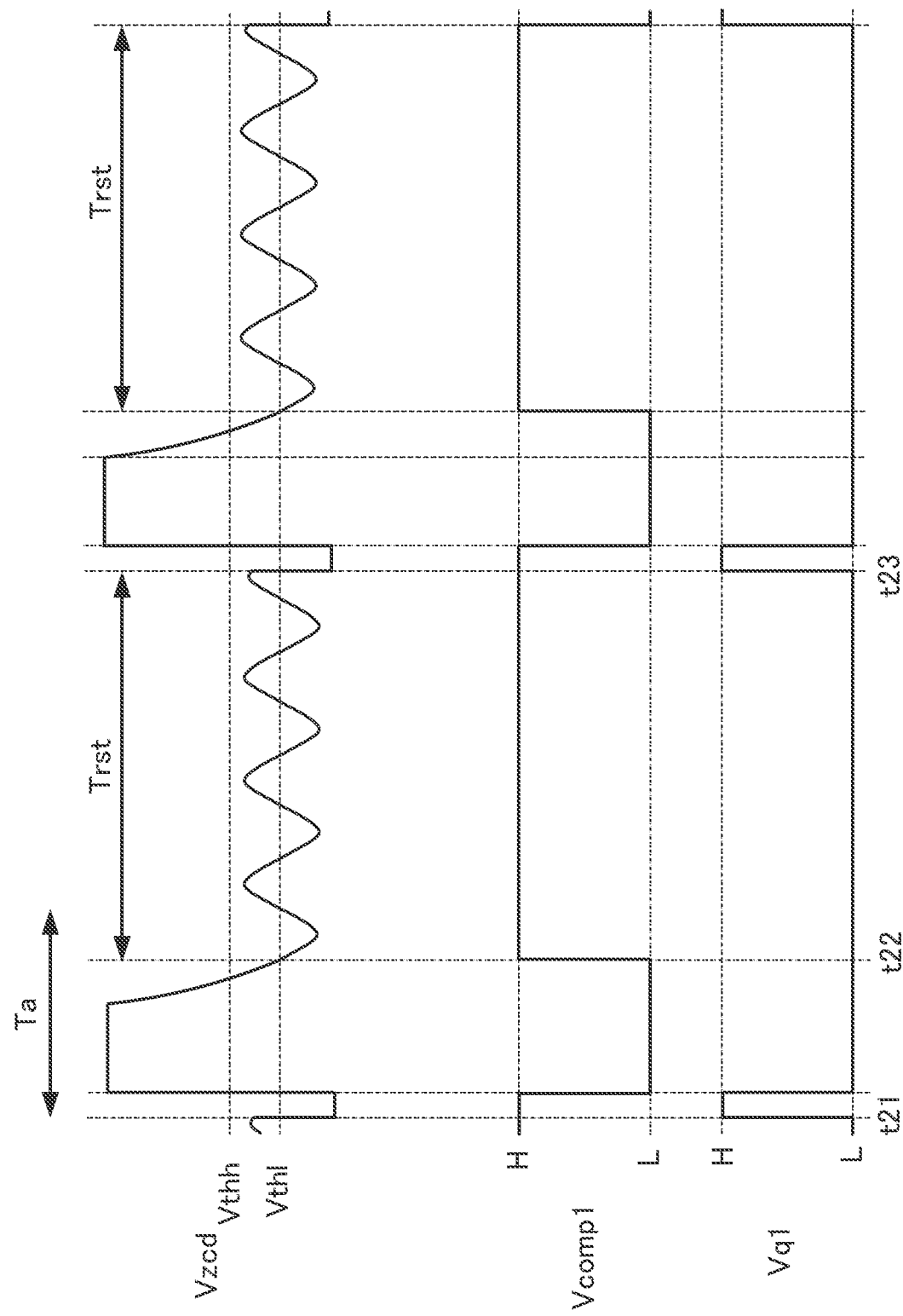
FIG. 6 shows an example of operation waveforms of the signal output circuit 41a and a restart timer 42.

FIG. 6 shows an example of operation waveforms of the restart timer 42 and the frequency reduction circuit 50a.

In FIG. 6, as in FIG. 5, the signal output circuit 41a tries to operate in the bottom skip mode.

Here, after the MOS transistor 30 is turned off, the amplitudes of the inductor current IL and the voltage Vzcd increase as the boost ratio in the boost chopper circuit increases and decrease as the boost ratio decreases. FIG. 6 illustrates a case where the boost ratio decreases and the amplitude of the voltage Vzcd decreases.

When the signal output circuit 41a operates in the bottom skip mode, if the high signal Vcomp1 continues to be outputted for a period longer than a period Trst, the restart timer 42 outputs a signal Vq1 to turn on the MOS transistor 30.

Here, the operation of the output circuit 61 from time t21 when the MOS transistor 30 is turned on to time t22 when the MOS transistor 30 is turned off and the voltage Vzcd indicates the threshold Vth1 is the same as that in FIG. 5. Hereinafter, an operation of a circuit included in the power factor correction IC 29a after time t22 will be described.

At time t22, the comparator circuit 40 determines that the voltage Vzcd applied to the terminal ZCD is smaller than the threshold voltage Vth1. As a result, it is detected that the inductor current IL flowing through the primary coil L1 has become 0. Based on the detection result, the comparator circuit 40 changes the level of the signal Vcomp1 to be outputted from low to high.

After the inductor current IL has become 0, the voltage Vzcd vibrates in a sinusoidal manner. However, the amplitude of the voltage Vzcd becomes smaller than |threshold Vthh-threshold Vth1| when the boost ratio of the boost chopper circuit is small.

For example, in a range where a phase angle of an input current Iin to the full-wave rectifier circuit 23 is a high phase angle, the boost ratio of the boost chopper circuit is small. Therefore, the amplitude of the vibration of the voltage Vzcd may fall below |threshold Vthh-threshold Vth1| in the range where the phase angle of the input current Iin is the high phase angle.

A situation where the phase angle of the input current Iin and the AC voltage Vac is the "high phase angle" means that the angle is in the range of, for example, 90±10±180n degrees, that is, in the range of (80 to 100)+180n degrees. On the other hand, a "low phase angle" means that the angle is in the range of, for example, 0±10±180n degrees, that is, in the range of (−10 to +10)+180n degrees. Here, n is an integer.

In a bottom skip mode similar to FIG. 5, the signal output circuit 41a waits until the number of times the voltage Vzcd becomes the threshold Vthh and then becomes the threshold Vth1 reaches a predetermined number of times due to the vibration of the voltage Vzcd after it is detected that the inductor current IL has become 0.

However, when the amplitude of the vibration of the voltage Vzcd falls below |threshold Vthh-threshold Vth1|, the voltage Vzcd may not exceed the threshold Vthh no matter how much time elapses after time t22. In this case, the signal output circuit 41a no longer outputs the signal to turn on the MOS transistor 30 no matter how much time elapses after time t22. Further, after the time t22, the comparator circuit 40 continues to output the high signal.

Therefore, the restart timer 42 times a period from when the comparator circuit 40 starts to output the high signal Vcomp1. When the comparator circuit 40 continues to output the high signal Vcomp1 during the period Trst, the restart timer 42 outputs a signal to turn on the MOS transistor 30.

That is, at time t23 when the period Trst has elapsed since time t22, the restart timer 42 outputs a signal to turn on the MOS transistor 30. As a result, the MOS transistor 30 is turned on at time t23.

After time t23, the operation from time t21 to time t23 is repeated. As in FIG. 5, since the load 12 is in the light load condition, FIG. 6 shows that the period between time t21 to time t22 (period from when the MOS transistor 30 is turned on until the MOS transistor 30 is turned off and the inductor current IL becomes 0) is shorter than the period Ta.

==Influence of Operation of Restart Timer 42 on Input Current Iin=

Figure 7:
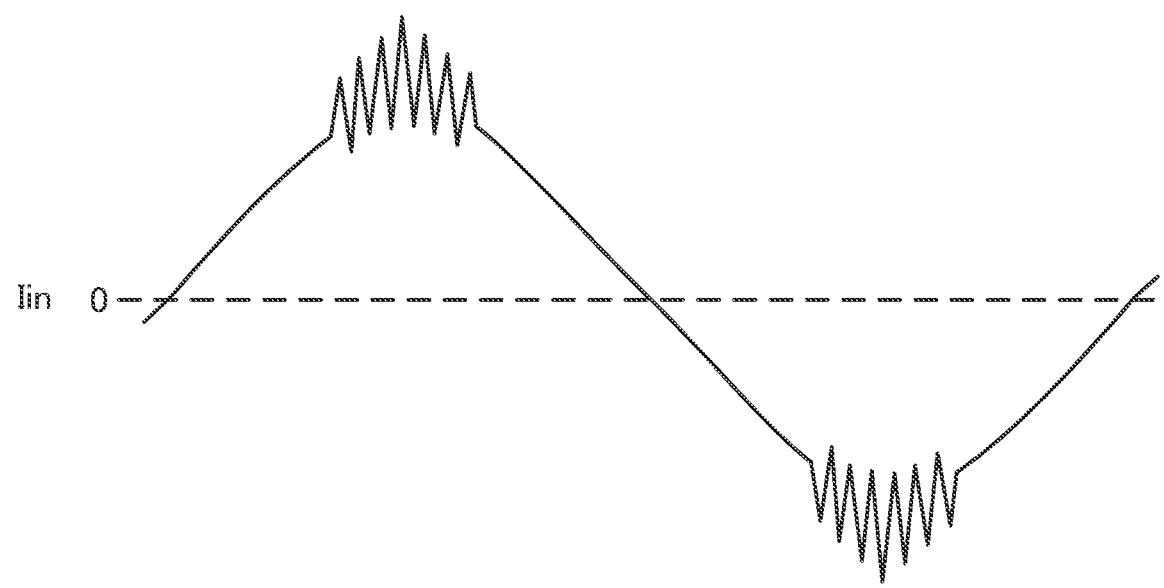

When the load 12 is in the light load condition, the signal output circuit 41a operates in the bottom skip mode. With reference to FIG. 7, an influence of the operation of the restart timer 42 on the input current Iin when the load 12 is in the light load condition will be described.

In the AC-DC converter 10a, when the phase angle of the AC voltage Vac and the input current Iin is a high phase angle, an instantaneous value of the AC voltage Vac increases, resulting in a reduction in the boost ratio of the boost chopper circuit. Therefore, in the range where the phase angle of the AC voltage Vac and the input current Iin is the high phase angle, the amplitude of the voltage Vzcd after the inductor current IL flowing through the primary coil L1 has become 0 decreases.

When the amplitude of the vibration of the voltage Vzcd falls below |threshold Vthh-threshold Vth1|, the voltage Vzcd does not exceed the threshold Vthh no matter how much time elapses after the inductor current IL has become 0. Therefore, the operation of the restart timer 42 described with reference to FIG. 6 turns on the MOS transistor 30.

In this case, since the period Trst is long as a waiting period, the off period of the MOS transistor 30 becomes longer. Therefore, when the load 12 is in the light load condition, the input current Iin is distorted from the sine wave in the range where the AC voltage Vac and the input current Iin have the high phase angle, as shown in FIG. 7. As a result, the power factor of the AC-DC converter 10a may deteriorate.

<<Embodiment>>

==Configuration of AC-DC Converter 10b==

Figure 8:
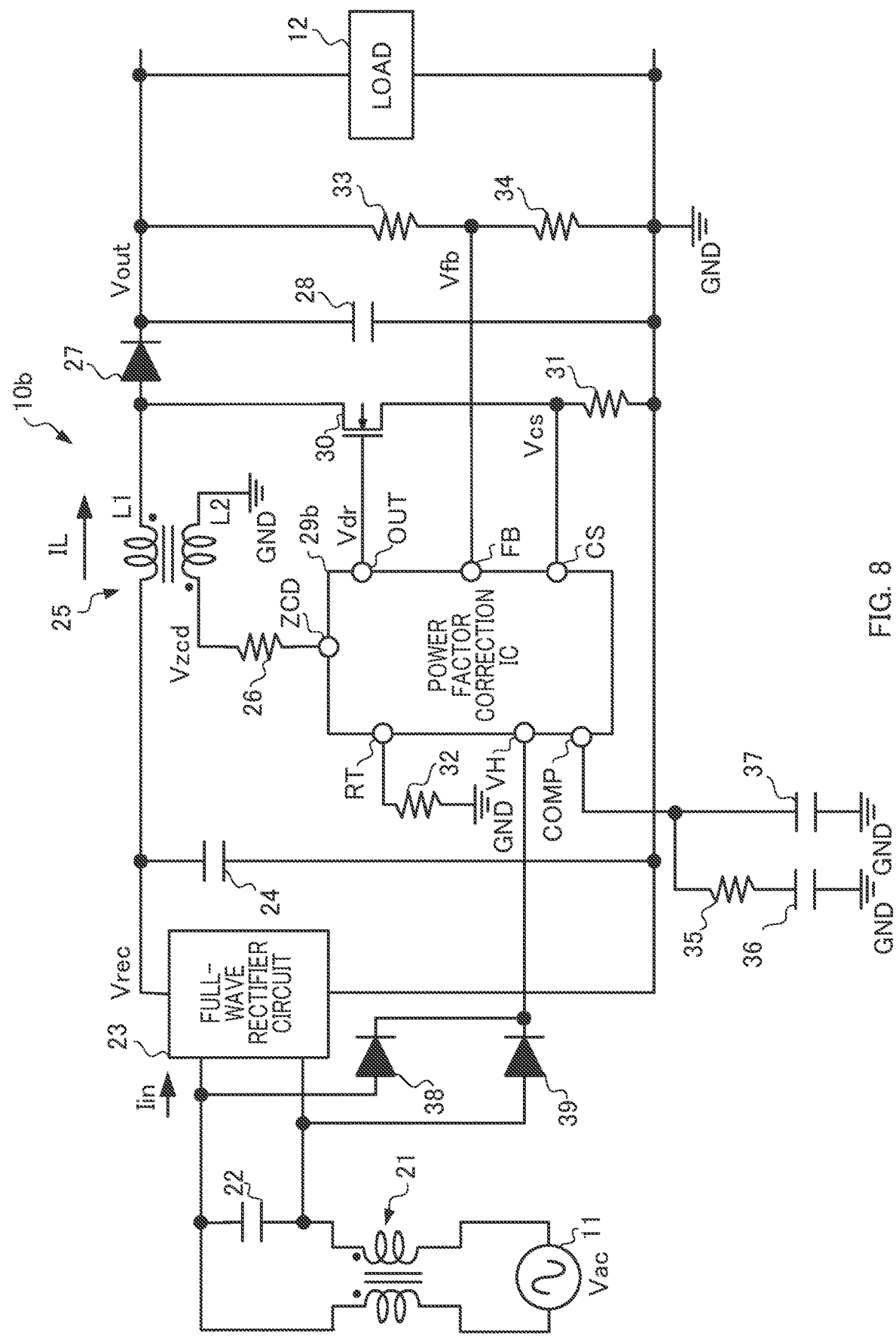
FIG. 8 shows an example of a configuration of an AC-DC converter 10b.

FIG. 8 shows an example of a configuration of the AC-DC converter 10b according to an embodiment of the present disclosure. In FIG. 8, the configuration denoted by the same reference numerals as the configuration of the AC-DC converter 10a in FIG. 1 corresponds to the same configuration.

The AC-DC converter 10b includes a choke coil 21, capacitors 22, 24, 28, 36, and 37, a full-wave rectifier circuit 23, a transformer 25, resistors 26 and 31 to 35, diodes 27, 38, and 39, a power factor correction IC 29a, and a MOS transistor 30. That is, the AC-DC converter 10b is different from the AC-DC converter 10a in including the power factor correction IC 29b instead of the power factor correction IC 29a and in further including the diodes 38 and 39.

The power factor correction IC 29b has terminals CS, COMP, FB, RT, OUT, VH, and ZCD. That is, the power factor correction IC 29b has the terminal VH in addition to the terminals of the power factor correction IC 29a. The power factor correction IC 29b has other terminals (for example, a power supply terminal, a GND terminal, and the like) as in the case of the power factor correction IC 29a, but those terminals are omitted in FIG. 8.

The diodes 38 and 39 apply a voltage Vh corresponding to an AC voltage Vac to the terminal VH of the power factor correction IC 29b. The diodes 38 and 39 configure a full-wave rectifier circuit in front of the full-wave rectifier circuit 23. Since the diodes 38 and 39 are provided in front of the full-wave rectifier circuit 23, the voltage Vh is not affected by the capacitor 24. This makes it possible to detect an accurate phase angle of the voltage Vh.

In this embodiment, the AC-DC converter 10b corresponds to a "power supply circuit". The primary coil L1 corresponds to a "first inductor", and the auxiliary coil L2 corresponds to a "second inductor". The MOS transistor 30 corresponds to a "transistor".

The terminal VH corresponds to a "first terminal" and the voltage Vh applied to the terminal VH corresponds to a "second voltage". The terminal ZCD corresponds to a "second terminal". The voltage Vzcd applied to the terminal ZCD corresponds to a "first voltage".

==Configuration of Power Factor Correction IC 29b==

Figure 9:
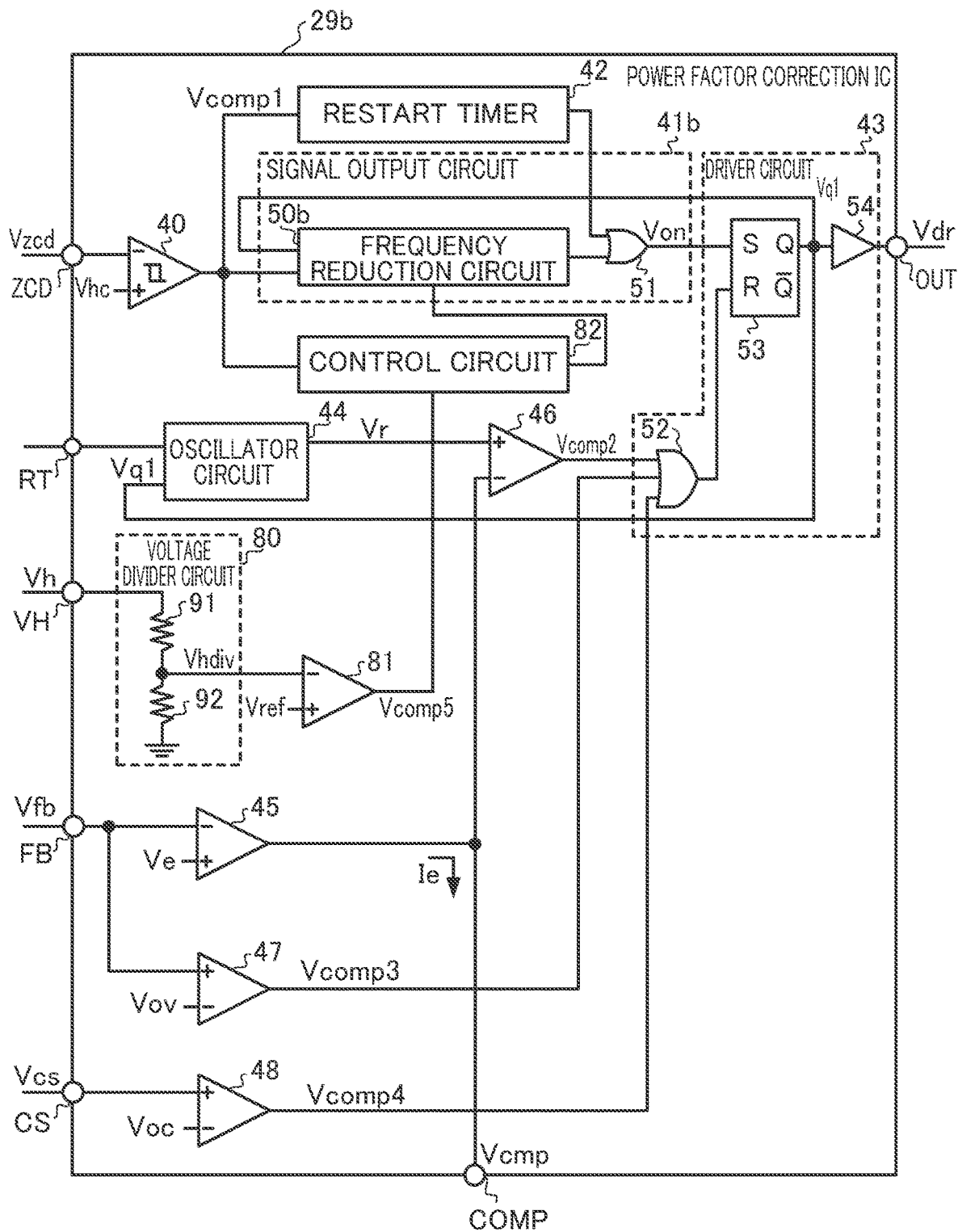
FIG. 9 shows an example of a configuration of a power factor correction IC 29b.

FIG. 9 shows an example of a configuration of the power factor correction IC 29b according to the embodiment. In FIG. 9, the configuration denoted by the same reference numerals as the configuration of the power factor correction IC 29b in FIG. 2 corresponds to the same configuration.

The power factor correction IC 29b includes a comparator circuit 40, a signal output circuit 41b, a restart timer 42, a driver circuit 43, an oscillator circuit 44, an error amplifier circuit 45, comparator circuits 46 to 48, a voltage divider circuit 80, a comparator circuit 81, and a control circuit 82. The power factor correction IC 29b is different from the power factor correction IC 29a in including the signal output circuit 41b instead of the signal output circuit 41a and in further including the voltage divider circuit 80, the comparator circuit 81, and the control circuit 82.

===Voltage Divider Circuit 80 and Comparator Circuit 81===

A voltage divider circuit 80 and a comparator circuit 81 are coupled to the terminal VH.

The voltage divider circuit 80 divides the voltage Vh applied to the terminal VH and supplies a voltage Vhdiv to the comparator circuit 81. The voltage divider circuit 80 includes resistors 91 and 92.

The comparator circuit 81 compares the voltage Vhdiv with a reference voltage Vref and determines whether or not the AC voltage Vac has a high phase angle. The comparator circuit 81 outputs a signal Vcomp 5 corresponding to the determination result to the control circuit 82.

The comparator circuit 81 outputs a low signal Vcomp5 when the AC voltage Vac has the high phase angle. On the other hand, the comparator circuit 81 outputs a high signal Vcomp5 when the AC voltage Vac does not have the high phase angle.

===Outline of Control Circuit 82 and Signal Output Circuit 41b===

The control circuit 82 controls the signal output circuit 41b when the AC voltage Vac has the high phase angle. Particularly, the control circuit 82 controls the signal output circuit 41b to operate in the critical mode when the load 12 is in the light load condition and the AC voltage Vac has the high phase angle as the amplitude of the voltage Vzcd becomes smaller than |voltage Vthh-voltage Vth1|.

On the other hand, when the amplitude of the voltage Vzcd is larger than |voltage Vthh-voltage Vth1|, the control circuit 82 controls the signal output circuit 41b to operate in the critical mode or bottom skip mode.

The signal output circuit 41b includes a frequency reduction circuit 50b and an OR circuit 51. Unlike the frequency reduction circuit 50a, the frequency reduction circuit 50b has an AND circuit 73 that receives a signal Vctr outputted from the control circuit 82. The AND circuit 73 will be described later with reference to FIG. 10.

Here, the value 0 (or substantially zero) of the inductor current IL corresponds to a "first predetermined value", and the threshold Vth1 of the comparator circuit 40 at that time corresponds to a "first threshold". Further, the comparator circuit 40 corresponds to a "first detection circuit" that detects that the inductor current has become 0.

As for the amplitude of the voltage Vzcd, |threshold Vthh-threshold Vth1| corresponds to a "second predetermined value". Along with the threshold Vth1, the threshold Vthh that determines |threshold Vthh-threshold Vth1| corresponds to a "second threshold value".

The critical mode corresponds to a "first mode" and the bottom skip mode corresponds to a "second mode". The period Tbs for which the signal output circuit 41b waits in the bottom skip mode corresponds to a "first period".

The restart timer 42 corresponds to a "second timer circuit" and the period Trst timed by the restart timer 42 corresponds to a "third period".

The comparator circuit 81 corresponds to a "second detection circuit" and the fact that the AC voltage Vac is in the range of the high phase angle corresponds to the fact that the AC voltage Vac is in a "predetermined range".

==Details of Frequency Reduction Circuit 50b and Control Circuit 82==

Figure 10:
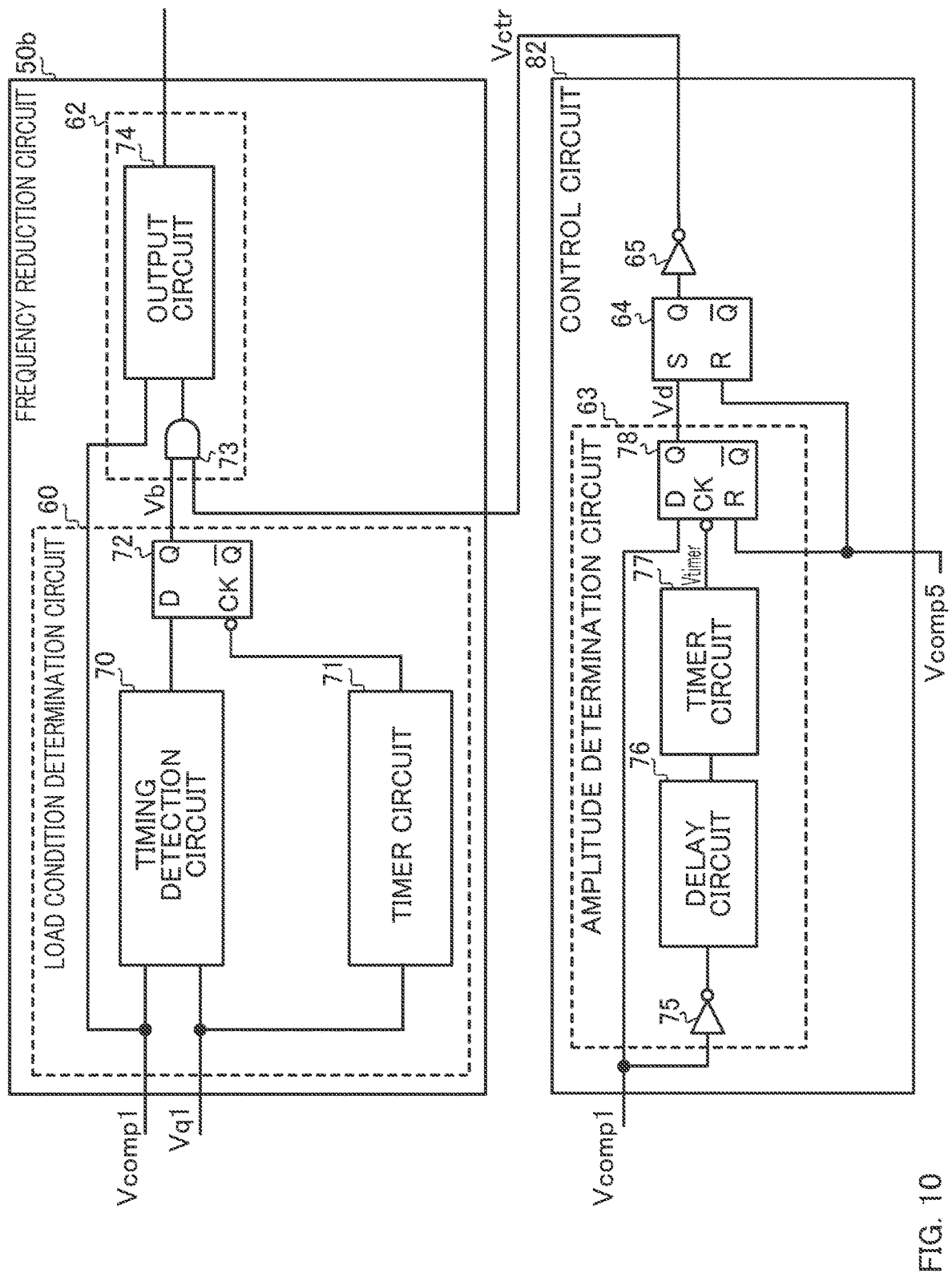
FIG. 10 shows an example of a configuration of a frequency reduction circuit 50b and a control circuit 82.

FIG. 10 shows an example of configurations of the frequency reduction circuit 50b and the control circuit 82. In the frequency reduction circuit 50b of FIG. 10, the configuration denoted by the same reference numerals as the configuration of the frequency reduction circuit 50a in FIG. 3 corresponds to the same configuration.

===Control Circuit 82===

The control circuit 82 operates assuming that the AC voltage Vac has a high phase angle when the comparator circuit 81 of FIG. 9 outputs a low signal Vcomp5. The control circuit 82 outputs a signal Vctr corresponding to the determination result of the vibration amplitude of the voltage Vzcd, and controls the operation of the frequency reduction circuit 50b.

The control circuit 82 includes an amplitude determination circuit 63, an RS flip-flop 64, and an inverter 65.

===Amplitude Determination Circuit 63===

The amplitude determination circuit 63 determines whether or not the amplitude of the vibration of the voltage Vzcd after the inductor current IL flowing through the primary coil L1 has become 0 is larger than |threshold Vthh-threshold Vth1| based on the signal Vcomp1. A low signal is outputted when the amplitude is larger than |threshold Vthh-threshold Vth1|, and a high signal is outputted when the amplitude is smaller than |threshold Vthh-threshold Vth1|.

The amplitude determination circuit 63 includes an inverter 75, a delay circuit 76, a timer circuit 77, and a D flip-flop 78. The amplitude determination circuit 63 determines whether or not the amplitude of the voltage Vzcd is larger than |threshold Vthh-threshold Vth1| based on the signal Vcomp1 outputted by the comparator circuit 40 in FIG. 9.

When the inductor current IL becomes 0 after the MOS transistor 30 is turned off, the voltage Vzcd falls below the threshold Vth1 and the comparator circuit 40 outputs a high signal Vcomp1. Thereafter, when the voltage Vzcd exceeds the threshold Vthh due to the vibration of the voltage Vzcd as described with reference to FIGS. 5 and 6, the comparator circuit 40 outputs a low signal Vcomp1. On the other hand, when the voltage Vzcd exceeds the threshold Vthh and then falls below the threshold Vth1 again, the comparator circuit 40 outputs a high signal Vcomp1.

The inverter 75 inverts the level of the signal Vcomp1. Specifically, the inverter 75 inverts the high signal Vcomp1, which is outputted when the voltage Vzcd falls below the threshold Vth1, to low. On the other hand, the inverter 75 inverts the low signal Vcomp1, which is outputted when the voltage Vzcd exceeds the threshold Vthh, to high.

The delay circuit 76 delays the signal outputted from the inverter 75. As a result, a signal inputted to the timer circuit 77 is delayed, and a signal outputted by the timer circuit 77 to the CLK input of the D flip-flop 78 is also delayed.

The timer circuit 77 times a period during which the level of the voltage Vzcd is smaller than the threshold Vthh after the inductor current IL has become 0. Specifically, when the delay circuit 76 outputs the low signal from the inverter 75, the timer circuit 77 starts timing and outputs a high signal Vtimer. The timer circuit 77 then times the period Tb and changes the signal Vtimer to low when finished with timing the period Tb.

Here, the period Tb is set to a period shorter than the period Trst (for example, 10 to 20 µs) timed by the restart timer 42.

As described above, the signal output circuit 41b waits until the number of times the voltage Vzcd becomes the threshold Vthh and then becomes the threshold Vth1 reaches a predetermined number of times in the bottom skip mode.

The period Tb is set longer than (predetermined number of times)×(typical period of vibration) with respect to the typical period of vibration of the voltage Vzcd. For example, if the preset number is 1 and the typical period is 2 µs, it may be set to 1.5 periods (3 µs) or 2 periods (4 µs).

The D flip-flop 78 outputs from the Q output a signal Vd corresponding to the level of the signal Vcomp1 outputted to the D input by the comparator circuit 40 at the timing when the signal outputted to the CK input by the timer circuit 77 changes to low. Therefore, depending on the level of the signal Vd outputted from the Q output by the D flip-flop 78, it can be determined whether or not the period during which the amplitude of the voltage Vzcd is smaller than |threshold Vthh-threshold Vth1| is longer than the period Tb.

When the signal Vd outputted from the Q output of the D flip-flop 78 is high, the period during which the high signal Vcomp1 is outputted is longer than the period Tb. This means that the period during which the amplitude of the voltage Vzcd is smaller than |threshold Vthh-threshold Vth1| is longer than the period Tb.

Therefore, when the signal Vd outputted from the D flip-flop 78 is high, it can be determined that the amplitude of the vibration of the voltage Vzcd is smaller than |threshold Vthh-threshold Vth1|. On the other hand, when the signal Vd is low, it can be determined that the amplitude of the vibration of the voltage Vzcd is larger than |threshold Vthh-threshold Vth1|.

By providing the delay circuit 76, the timer circuit 77 times the period Tb from a timing slightly later than the timing when the inductor current becomes 0 and the signal Vcomp1 changes to high. Therefore, a low signal Vd is outputted also when the falling edge of the signal Vcomp1 is inputted to the D input at the timing when the period Tb has elapsed since the signal Vcomp1 changed to high.

That is, which level the signal Vcomp1 inputted to the D input is at when the period Tb has elapsed since the inductor current became 0 is surely reflected on the signal Vd.

With respect to the R input of the D flip-flop 78, the D flip-flop 78 operates when the AC voltage Vac has the high phase angle according to the level of the signal Vcomp5 outputted by the comparator circuit 81.

Specifically, when the AC voltage Vac has the high phase angle with respect to the R input of the D flip-flop 78, the comparator circuit 81 outputs a low signal Vcomp5. In this case, the D flip-flop 78 reflects the level of the D input on the Q output at the timing when the level of the CK input changes.

===RS Flip-Flop 64 and Inverter 65===

Back to the description of the configuration of the control circuit 82, when the amplitude determination circuit 63 determines that the amplitude of the vibration of the voltage Vzcd is smaller than |threshold Vthh-threshold Vth1|, the RS flip-flop 64 holds the determination result from the amplitude determination circuit 63.

The RS flip-flop 64 latches the high signal Vd outputted by the amplitude determination circuit 63. Once it is determined that the amplitude of the voltage Vzcd is smaller than |threshold Vthh-threshold Vth1|, the RS flip-flop 64 continues to output the high signal from the Q output until a high signal Vcomp5 is inputted to the R input.

As a result, in a boundary region where the input voltage Vac approaches a high phase angle and the amplitude of the vibration of the voltage Vzcd exceeds or does not exceed |threshold Vthh-threshold Vth1|, once the operation of the signal output circuit 41b is switched to the critical mode, the signal output circuit 41b continues to operate in the critical mode. That is, it is possible to prevent frequent switching between the bottom skip mode and the critical mode in the boundary region where the amplitude of the vibration of the voltage Vzcd exceeds or does not exceed |threshold Vthh-threshold Vth1|.

When the AC voltage Vac does not have the high phase angle, a low signal is outputted from the Q output of the RS flip-flop 64 when the high signal Vcomp5 is outputted from the comparator circuit 81 to the R input of the RS flip-flop 64.

The inverter 65 inverts the level of the signal outputted from the Q output by the RS flip-flop 64. That is, when the amplitude determination circuit 63 determines that the amplitude of the vibration of the voltage Vzcd is smaller than |threshold Vthh-threshold Vth1| when the AC voltage Vac has the high phase angle, the inverter 65 outputs a low signal Vctr.

As a result, once the low signal is outputted from the inverter 65 of the control circuit 82, the control circuit 82 continues to output the low signal Vctr. When the high signal Vcomp5 is outputted from the comparator circuit 81 to the R input of the RS flip-flop 64, the condition is released and the magnitude of the vibration amplitude of the voltage Vzcd is determined.

When the amplitude determination circuit 63 determines that the amplitude of the vibration of the voltage Vzcd is larger than |threshold Vthh-threshold Vth1| when the AC voltage Vac has the high phase angle, the inverter 65 outputs a high signal Vctr. On the other hand, when it is determined that the AC voltage Vac does not have the high phase angle, a low signal Vctr is outputted.

===Frequency Reduction Circuit 50b===

The frequency reduction circuit 50b includes a load condition determination circuit 60 and a drive signal output circuit 62. The frequency reduction circuit 50b is different from the frequency reduction circuit 50a in including the drive signal output circuit 62 instead of the output circuit 61 of the frequency reduction circuit 50a.

The drive signal output circuit 62 includes an AND circuit 73 and an output circuit 74. Here, the output circuit 74 is the same circuit as the output circuit 61 in the frequency reduction circuit 50a. As a result, the frequency reduction circuit 50b is different from the frequency reduction circuit 50a in including the AND circuit 73 in front of the output circuit 74.

The AND circuit 73 outputs a signal to operate the output circuit 74 in the bottom skip mode when it is indicated that the load 12 is in the light load condition and that the amplitude of the voltage Vzcd after the inductor current IL has become 0 is larger than |threshold Vthh-threshold Vth1|.

That is, the AND circuit 73 calculates a logical product of the signal Vb from the D flip-flop 72 and the signal Vctr from the control circuit 82. Therefore, the AND circuit 73 outputs a high signal to the output circuit 74 when the signal Vb from the D flip-flop 72 of the load condition determination circuit 60 and the signal Vctr from the control circuit 82 are both high. The AND circuit 73 outputs a low signal to the output circuit 74 when the level of any of the signals inputted is low.

When the output from the AND circuit 73 is high, the output circuit 74 outputs a signal to turn on the MOS transistor 30 in the bottom skip mode. On the other hand, the output circuit 74 outputs a signal to turn on the MOS transistor 30 in the critical mode when the output from the AND circuit 73 is low.

The output circuit 74 outputs a signal to turn on the MOS transistor 30 when the output from the AND circuit 73 changes to low while operating in the bottom skip mode. Therefore, when the signal Vctr from the control circuit 82 changes from high to low, the MOS transistor 30 is immediately turned on.

Here, the amplitude determination circuit 63 corresponds to a "first determination circuit", and the determination result of whether or not the voltage Vzcd is larger than |threshold Vthh-threshold Vth1| from the amplitude determination circuit 63 and the level of the corresponding signal Vd correspond to a "first determination result".

The timer circuit 77 corresponds to a "first timer circuit" and the D flip-flop 78 corresponds to a "first output circuit".

The period Tb timed by the timer circuit 77 corresponds to a "second period". The RS flip-flop 64 corresponds to a "holding circuit".

The load condition determination circuit 60 corresponds to a "second determination circuit" and the determination result of whether or not the condition of the load 12 is the light load condition and the level of the corresponding signal Vb correspond to a "second determination result".

The drive signal output circuit 62 corresponds to a "second output circuit".

===Major Waveform Diagram of Power Factor Correction IC 29b===

Figure 11:
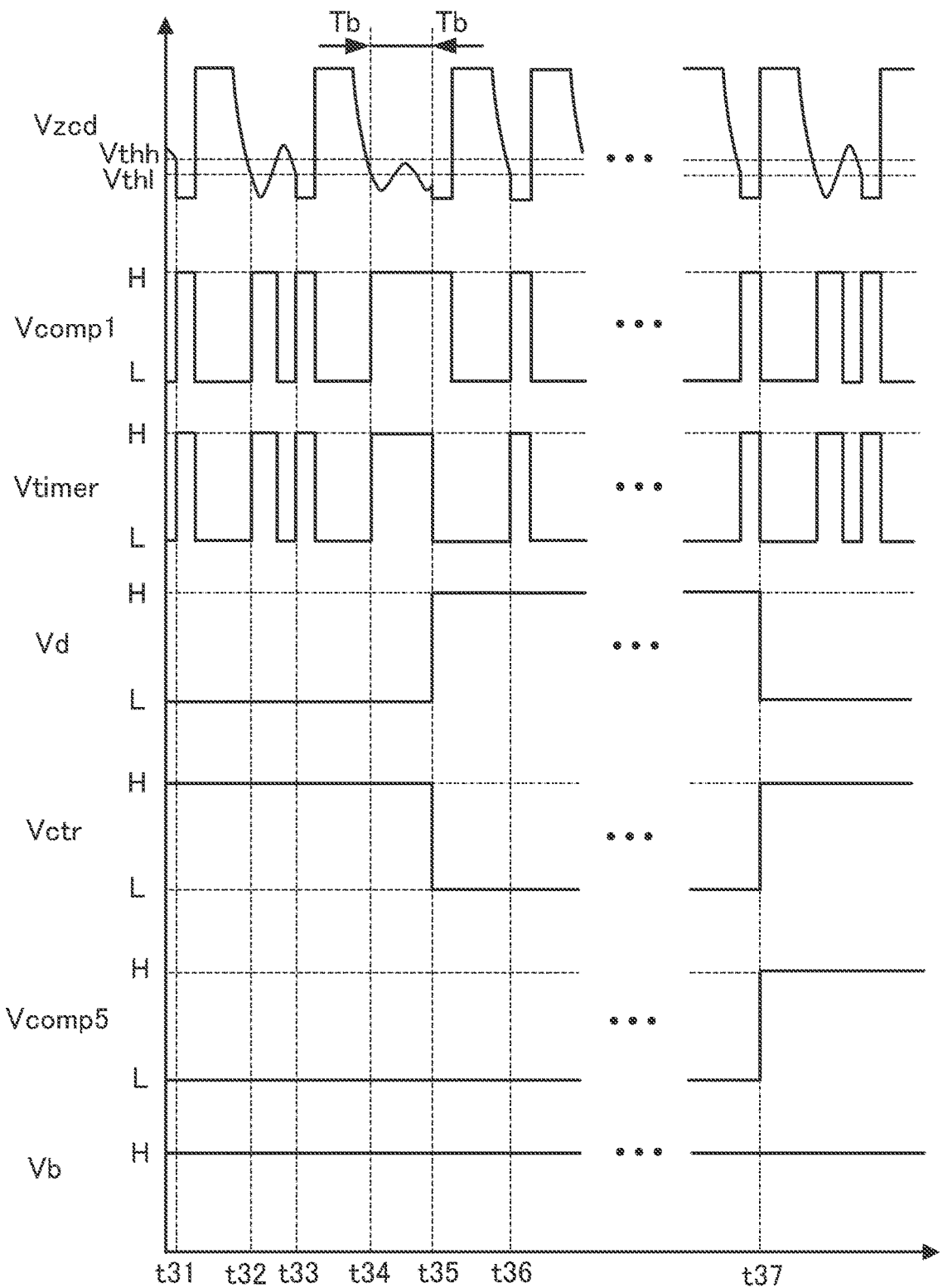
FIG. 11 is a diagram illustrating an example of major waveforms in the operation of the power factor correction IC 29b.

FIG. 11 is a diagram illustrating major waveforms in the operation of the power factor correction IC 29b. The operations of the circuits illustrated in FIGS. 8 to 10 will be described with reference to the waveforms.

FIG. 11 shows the waveforms from the time when the load 12 is in the light load condition and Vcomp 5 is high. FIG. 11 also shows the waveforms when the comparator circuit 81 determines that the AC voltage Vac have the high phase angle (Vcomp 5 is low).

Note that FIG. 11 shows the waveforms from the time when the amplitude of the vibration of the voltage Vzcd after the inductor current IL has become 0 is larger than |threshold Vthh-threshold Vth1|. Therefore, at the first time point shown in FIG. 11, the amplitude determination circuit 63 outputs a low signal Vd and the control circuit 82 outputs a high signal Vctr.

FIG. 11 includes a section where, for convenience of illustration, the timing when the level of the signal Vtimer outputted by the timer circuit 77 changes is depicted in the same manner as the timing when the level of the signal Vcomp1 changes. However, in the control circuit 82 according to this embodiment, since the delay circuit 76 is provided, the timing when the level of the signal Vtimer changes is actually a timing slightly delayed from the timing when the level of the signal Vcomp1 changes.

At time t31, since the load 12 is in the light load condition, the load condition determination circuit 60 outputs a high signal Vb. When the driver circuit 43 turns on the MOS transistor 30, the voltage Vzcd applied to the terminal ZCD also decreases.

Thereafter, the MOS transistor 30 is turned off, and at time t32, the comparator circuit 40 determines that the voltage Vzcd has fallen below the threshold Vth1. The signal output circuit 41b operates in the bottom skip mode in response to the low signal Vd. At time t33, the signal output circuit 41b outputs a signal Von to turn on the MOS transistor 30. Therefore, during a period between time t31 and time t33, the same operation as that during the period between time t11 and time t14 in FIG. 5 is executed.

At time t33, the driver circuit 43 turns on the MOS transistor 30. The operation from time t33 to time t34 where the voltage Vzcd falls below the threshold value Vth1 after the MOS transistor is turned off is the same as the operation from time t31 to time t32.

At time t34, the comparator circuit 40 determines that the voltage Vzcd has fallen below the threshold voltage Vth1.

Thus, it is detected that the inductor current IL flowing through the primary coil L1 has become 0.

The comparator circuit 40 changes the level of the signal Vcomp1 to be outputted to high. The timer circuit 77 changes the level of the signal Vtimer to high.

In FIG. 11, a change in amplitude in the vibration of the voltage Vzcd after the inductor current IL falls below 0 is emphasized for convenience. In the vibration after time t34, the amplitude of the voltage Vzcd becomes smaller than

|threshold Vthh-threshold Vth1|. Therefore, the comparator circuit 40 continues to output the high signal Vcomp1.

At time t35, a period Tb has elapsed since the comparator circuit 40 started to output the high signal Vcomp1 at time t34, and the timer circuit 77 changes the level of the signal Vtimer to low.

Since the signal Vcomp5 at the D input of the D flip-flop 78 is high, the amplitude determination circuit 63 determines that the amplitude of the voltage Vzcd is smaller than |threshold Vthh-threshold Vth1| and changes the level of the signal Vd to be outputted to high.

The RS flip-flop 64 latches the level of the Q output to high as long as the signal Vcomp5 is low. The control circuit 82 changes the level of the signal Vctr to be outputted to low.

Since the low signal Vctr is inputted to the AND circuit 73, the drive signal output circuit 62 operates in the critical mode. Accordingly, the drive signal output circuit 62 outputs a signal to turn on the MOS transistor 30.

The operation from time t35 to time t36 when the voltage Vzcd falls below the threshold Vth1 after the driver circuit 43 turns off the MOS transistor 30 is the same as the operation from time t33 to time t34.

At time t36, the inductor current IL becomes 0 and the voltage Vzcd falls below the threshold Vth1. Since the control circuit 82 outputs the low signal Vctr, the signal output circuit 41b outputs a signal Von to turn on the MOS transistor 30 in the critical mode. Therefore, from time t36, the driver circuit 43 turns on the MOS transistor 30.

At time t37, after the signal output circuit 41b continues to operate in the critical mode for a certain period of time, the comparator circuit 81 determines that the AC voltage Vac no longer has the high phase angle. Thus, the comparator circuit 81 changes the level of the signal Vcomp5 to high.

Therefore, the D flip-flop 78 and the RS flip-flop 64 change the level of the signal Vd outputted from the Q output to low. Thus, the control circuit 82 outputs a high signal Vctr.

At time t37, again, the load 12 is light and the load condition determination circuit 60 outputs a high signal Vb. Therefore, after time t37, the signal output circuit 41 operates in the bottom skip mode as in the period between time t31 and time t33.

==Waveform of Input Current Iin in AC-DC Converter 10b==

Figure 12:
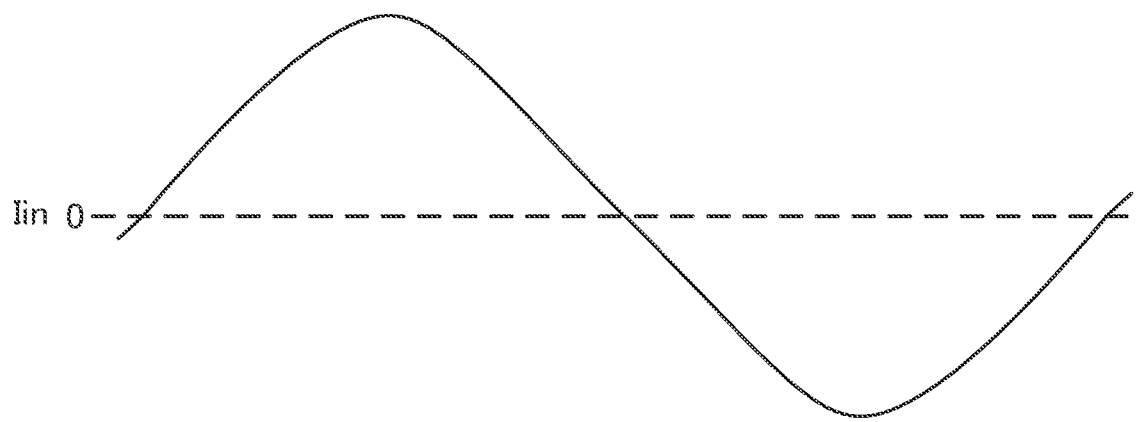
FIG. 12 shows an example of an inductor current waveform of the AC-DC converter 10b.

FIG. 12 shows an example of a waveform of the input current Iin of the AC-DC converter 10b. As in the case of FIG. 7, FIG. 12 shows an example of a waveform in the AC-DC converter 10b when the signal output circuit 41b operates in the bottom skip mode when the load 12 is in the light load condition.

In this embodiment, when the amplitude of the vibration of the voltage Vzcd after the inductor current IL flowing through the primary coil L1 indicates 0 falls below |threshold Vthh-threshold Vth1|, the control circuit 82 controls the signal output circuit 41b to operate in the critical mode.

Thus, in the AC-DC converter 10b, even when the input voltage Vac and the input current Iin have the high phase angle, the MOS transistor 30 starts up quickly after the inductor current IL becomes 0. Therefore, distortion of the waveform in the input current Iin is eliminated, and the waveform becomes sinusoidal. As a result, the power factor is improved in the power of the AC-DC converter 10b.

==Summary==

The AC-DC converter 10b and the power factor correction IC 29b according to this embodiment have been described above.

The power factor correction IC 29b is provided, which controls switching of the MOS transistor 30 in the AC-DC converter 10b that includes the primary coil L1 to which the rectified voltage Vrec corresponding to the AC voltage Vac is applied and the MOS transistor 30 configured to control an inductor current IL flowing through the primary coil L1, and generates an output voltage Vout at a target level from the AC voltage Vac. The power factor correction IC 29b includes: the comparator circuit 40; the signal output circuit 41b which operates in the critical mode or bottom skip mode; the control circuit 82 which controls the signal output circuit 41b to operate in the critical mode when the amplitude of the voltage Vzcd after the inductor current IL becomes 0 is smaller than |voltage Vthh-voltage Vth1| and controls the signal output circuit 41b to operate in the critical mode or bottom skip mode when the amplitude is larger than |voltage Vthh-voltage Vth1|; and the driver circuit 43. When the amplitude is larger than |voltage Vthh-voltage Vth1|, the signal output circuit 41b operates in either the critical mode or the bottom skip mode corresponding to the condition of the load 12 of the AC-DC converter 10b.

Accordingly, even when the AC voltage Vac and the input current Iin have the high phase angle with the load 12 in the light load condition, it is possible to provide the power factor correction IC 29b that does not deteriorate the power factor. Particularly, in the power factor correction IC 29b, when the signal output circuit 41b is operated in the bottom skip mode, the MOS transistor 30 can be turned on and off at appropriate timing even when the amplitude of the voltage Vzcd after the inductor current IL becomes 0 is smaller than |voltage Vthh-voltage Vth1|.

The control circuit 82 includes the amplitude determination circuit 63 that determines whether or not the amplitude of the voltage Vzcd is larger than |voltage Vthh-voltage Vth1| and the RS flip-flop 64 that holds the determination result from the amplitude determination circuit 63.

This makes it possible to prevent frequent switching between the bottom skip mode and the critical mode in the boundary region where the amplitude of the vibration of the voltage Vzcd exceeds or does not exceed |threshold Vthh-threshold Vth1|. Therefore, the operation of the power factor correction IC 29b becomes stable.

The power factor correction IC 29b also includes: the terminal VH to which the voltage Vh corresponding to the AC voltage Vac is applied; and the comparator circuit 81 that detects whether or not the phase angle of the AC voltage Vac is within a range indicating a high phase angle based on the voltage Vh. When the phase angle of the AC voltage Vac is within the range indicating the high phase angle and the amplitude determination circuit 63 outputs a determination result indicating that the amplitude is smaller than |voltage Vthh-voltage Vth1|, the RS flip-flop 64 holds the determination result from the amplitude determination circuit 63.

Thus, when it is determined that the amplitude of the vibration of the voltage Vzcd exceeds |threshold Vthh-threshold Vth1|, the phase angle of the AC voltage Vac becomes a low phase angle, and the determination result is held until it is determined that the amplitude of the voltage Vzcd is larger than |voltage Vthh-voltage Vth1|. Therefore, the operation of the power factor correction IC 29b becomes stable.

The comparator circuit 40 is a hysteresis comparator that compares the threshold Vth1 indicating 0 and the threshold Vthh that determines |voltage Vthh-voltage Vth1| together with the threshold Vth1 with the voltage Vzcd. The amplitude determination circuit 63 includes: the timer circuit 77 that times a period during which the amplitude of the voltage Vzcd is smaller than |voltage Vthh-voltage Vth1| after the inductor current IL becomes 0; and the D flip-flop 78 that outputs a determination result indicating that the amplitude of the voltage Vzcd is smaller than |voltage Vthh-voltage Vth1| when the period during which the amplitude of the voltage Vzcd is smaller than |voltage Vthh-voltage Vth1| becomes the period Tb.

Thus, the amplitude determination circuit 63 can determine that the period during which the amplitude of the voltage Vzcd is smaller than |voltage Vthh-voltage Vth1| exceeds the period Tb. Based on the period Tb, the signal output circuit 41b can switch from the bottom skip mode to the critical mode. Therefore, the power factor correction IC 29b can turn on and off the MOS transistor 30 at an appropriate timing even when the AC voltage Vac and the input current Iin have the high phase angle with the load 12 in the light load condition.

The power factor correction IC 29b also includes the restart timer 42 that times the period after the inductor current IL becomes 0, and the signal output circuit 41b outputs a signal to turn on the MOS transistor 30 when the period Trst longer than the period Tb is timed by the restart timer 42.

Thus, the period Tb is shorter than the period Trst. Therefore, in the power factor correction IC 29b, when the AC voltage Vac and the input current Iin have the high phase angle with the load 12 in the light load condition, the MOS transistor 30 can be turned on and off at a timing earlier than the restart timer 42.

The signal output circuit 41b includes: the load condition determination circuit 60 that determines whether or not the condition of the load 12 is the light load condition based on the period from when the MOS transistor 30 is turned on until the inductor current IL becomes 0; and the drive signal output circuit 62 that outputs a signal corresponding to the bottom skip mode when the load condition determination circuit 60 outputs a determination result indicating that the condition of the load 12 is the light load condition and outputs a signal corresponding to the critical mode when the load condition determination circuit 60 outputs a determination result indicating that the condition of the load 12 is not the light load condition when the amplitude is larger than |voltage Vthh-voltage Vth1|, and outputs the signal corresponding to the critical mode when the amplitude is smaller than |voltage Vthh-voltage Vth1|.

Thus, the signal output circuit 41b can not only switch between the critical mode and the bottom skip mode depending on the load condition, but also switch between the modes according to the amplitude of the voltage Vzcd. Therefore, the power factor correction IC 29b can turn on and off the MOS transistor 30 at an appropriate timing.

The power factor correction IC 29b also includes the terminal ZCD to which the voltage Vzcd from the auxiliary coil L2 magnetically coupled to the primary coil L1 is applied, and the voltage detected by the comparator circuit 40 is the voltage Vzcd applied to the terminal ZCD.

Thus, a change in the inductor current IL can be detected with high sensitivity based on the voltage Vzcd from the auxiliary coil L2. Therefore, the power factor correction IC 29b can turn on and off the MOS transistor 30 at an appropriate timing.

The AC-DC converter 10b which generates an output voltage Vout at a target level from an AC voltage Vac is provided. The AC-DC converter 10b includes: the primary coil L1 to which a rectified voltage Vrec corresponding to the AC voltage Vac is applied; the MOS transistor 30 that controls the inductor current IL flowing through the primary coil L1; and the power factor correction IC 29b that controls switching of the MOS transistor 30. The power factor correction IC 29b includes: the comparator circuit 40; the signal output circuit 41b that operates in the critical mode or bottom skip mode; the control circuit 82 that controls the signal output circuit 41b to operate in the critical mode when the amplitude of the voltage Vzcd after the inductor current IL becomes 0 is smaller than |voltage Vthh-voltage Vth1|, and controls the signal output circuit 41b to operate in the critical mode or bottom skip mode when the amplitude is larger than |voltage Vthh-voltage Vth1|; and the driver circuit 43. When the amplitude is larger than |voltage Vthh-voltage Vth1|, the signal output circuit 41b operates in either the critical mode or the bottom skip mode corresponding to the condition of the load 12 of the AC-DC converter 10b.

Thus, the AC-DC converter 10b is provided, including the power factor correction IC 29b that does not deteriorate the power factor even when the AC voltage Vac and the input current Iin have the high phase angle with the load 12 in the light load condition. Therefore, the power factor of the power provided by the AC-DC converter 10b is improved.

The present invention provides an integrated circuit and a power supply circuit that can improve a power factor regardless of the phase of a voltage of an AC power supply.

It is possible to provide an integrated circuit and a power supply circuit that can improve a power factor regardless of the phase of a voltage of an AC power supply.

Embodiments of the present disclosure described above are simply to facilitate understanding of the present disclosure and are not in any way to be construed as limiting the present disclosure. The present disclosure may variously be changed or altered without departing from its essential features and encompass equivalents thereof.

It should be noted that the operations, procedures, steps, stages, and the like in each process in a device, a system, a program, and a method described in the claims, the specification, and the drawings may be performed in any order, unless a term such as "before", "prior to" or the like is explicitly used or an output of a previous process is used in a subsequent process. Even if terms such as "first", "next", and/or the like are used, for convenience, with respect to an operation flowchart in the claims, the specification, and the drawings, this does not mean that the flowchart needs to be performed in that order.

What is claimed is:

1. An integrated circuit for a power supply circuit that generates an output voltage at a target level from an alternating-current (AC) voltage, the power supply circuit including
    a first inductor to which a rectified voltage corresponding to the AC voltage is applied, and
    a transistor configured to control an inductor current flowing through the first inductor,
the integrated circuit being configured to control switching of the transistor, the integrated circuit comprising:
    a first detection circuit that includes a hysteresis comparator having a high threshold voltage and a low threshold voltage, the first detection circuit being configured to detect whether or not the inductor current has reached a first predetermined value, based on a first voltage corresponding to the inductor current;
    a signal output circuit configured to operate in a first mode of outputting a signal to turn on the transistor when the inductor current has reached the first predetermined value indicating zero, or in a second mode of outputting the signal to turn on the transistor when a first period elapses after the inductor current has reached the first predetermined value;
a control circuit configured to control the signal output circuit to
  operate in the first mode when an amplitude of the first voltage after the inductor current has reached the first predetermined value is smaller than a second predetermined value, the second predetermined value corresponding to a difference between the high threshold voltage and the low threshold voltage of the hysteresis comparator, and
  operate in either the first mode or the second mode, corresponding to a condition of a load of the power supply circuit, when said amplitude is larger than the second predetermined value; and
a driver circuit configured to turn on the transistor based on the signal and to turn off the transistor based on a feedback voltage corresponding to the output voltage, wherein
the first mode is a critical mode; and
the second mode is a bottom skip mode.

2. The integrated circuit according to claim 1, wherein the control circuit includes
a first determination circuit configured to determine whether or not said amplitude is larger than the second predetermined value, and
a holding circuit configured to hold a first determination result from the first determination circuit.

3. The integrated circuit according to claim 2, further comprising:
a first terminal to which a second voltage corresponding to the AC voltage is applied; and
a second detection circuit configured to detect whether or not a phase of the AC voltage is within a predetermined range, based on the second voltage, wherein
the holding circuit holds the first determination result when the first determination result outputted from the first determination circuit indicates that said amplitude is smaller than the second predetermined value and when the phase of the AC voltage is within the predetermined range.

4. The integrated circuit according to claim 2, wherein the first determination circuit includes
a first timer circuit configured to time a period during which said amplitude is smaller than the second predetermined value after the inductor current has reached the first predetermined value, and
a first output circuit configured to output the first determination result indicating that said amplitude is smaller than the second predetermined value when the period timed by the first timer circuit becomes a second period.

5. An integrated circuit for a power supply circuit that generates an output voltage at a target level from an alternating-current (AC) voltage, the power supply circuit including
a first inductor to which a rectified voltage corresponding to the AC voltage is applied, and
a transistor configured to control an inductor current flowing through the first inductor,
the integrated circuit being configured to control switching of the transistor, the integrated circuit comprising:
a first detection circuit configured to detect whether or not the inductor current has reached a first predetermined value, based on a first voltage corresponding to the inductor current;
a signal output circuit configured to operate in a first mode of outputting a signal to turn on the transistor when the inductor current has reached the first predetermined value, or in a second mode of outputting the signal to turn on the transistor when a first period elapses after the inductor current has reached the first predetermined value;
a control circuit configured to control the signal output circuit to
  operate in the first mode when an amplitude, which is an amplitude of the first voltage after the inductor current has reached the first predetermined value, is smaller than a second predetermined value, and
  operate in either the first mode or the second mode, corresponding to a condition of a load of the power supply circuit, when said amplitude is larger than the second predetermined value; and
a driver circuit configured to turn on the transistor based on the signal and to turn off the transistor based on a feedback voltage corresponding to the output voltage, wherein
the control circuit includes
  a first determination circuit configured to determine whether or not said amplitude is larger than the second predetermined value, and
  a holding circuit configured to hold a first determination result from the first determination circuit;
the first detection circuit is a comparator circuit configured to compare the first voltage to each of
  a first threshold indicating the first predetermined value, and
  a second threshold that determines the second predetermined value together with the first threshold;
the first determination circuit includes
  a first timer circuit configured to time a period during which said amplitude is smaller than the second predetermined value after the inductor current has reached the first predetermined value, and
  a first output circuit configured to output the first determination result indicating that said amplitude is smaller than the second predetermined value when the period timed by the first timer circuit becomes a second period; and
  the integrated circuit further includes a second timer circuit configured to time a period after the inductor current has reached the first predetermined value, wherein
the signal output circuit outputs the signal to turn on the transistor when the period timed by the second timer circuit becomes a third period longer than the second period.

6. The integrated circuit according to claim 1, wherein the signal output circuit includes
a second determination circuit configured to determine whether or not the load is in a first state based on a time period from when the transistor is turned on until the inductor current reaches the first predetermined value, and to thereby output a second determination result, and
a second output circuit configured to output the signal to turn on the transistor, the signal
  corresponding to the second mode when the second determination result indicates that the load is in the first state, and corresponding to the first mode when the second determination result indicates that the load is not in the first state, when said amplitude is larger than the second predetermined value, and corresponding to the first mode when said amplitude is smaller than the second predetermined value.

7. The integrated circuit according to claim 1, wherein the power supply circuit further includes a second inductor magnetically coupled to the first inductor, the integrated circuit further includes a second terminal, and the first voltage is applied from the second inductor to the second terminal.

8. A power supply circuit configured to generate an output voltage at a target level from an alternating-current (AC) voltage, the power supply circuit comprising:

a first inductor to which a rectified voltage corresponding to the AC voltage is applied;

a transistor configured to control an inductor current flowing through the first inductor; and an integrated circuit configured to control switching of the transistor, wherein the integrated circuit includes a first detection circuit that includes a hysteresis comparator having a high threshold voltage and a low threshold voltage, the first detection circuit being configured to detect whether or not the inductor current has reached a first predetermined value, based on a first voltage corresponding to the inductor current, a signal output circuit configured to operate in a first mode of outputting a signal to turn on the transistor when the inductor current has reached the first predetermined value indicating zero, or in a second mode of outputting the signal to turn on the transistor when a first period elapses after the inductor current has reached the first predetermined value, a control circuit configured to control the signal output circuit to operate in the first mode when an amplitude of the first voltage after the inductor current has reached the first predetermined value is smaller than a second predetermined value, the second predetermined value corresponding to a difference between the high threshold voltage and the low threshold voltage of the hysteresis comparator, and operate in either the first mode or the second mode, corresponding to a condition of a load of the power supply circuit, when said amplitude is larger than the second predetermined value, and a driver circuit configured to turn on the transistor based on the signal and to turn off the transistor based on a feedback voltage corresponding to the output voltage, wherein the first mode is a critical mode; and the second mode is a bottom skip mode.

* * * * *